US008532503B2

(12) United States Patent
Nakashima et al.

(10) Patent No.: US 8,532,503 B2
(45) Date of Patent: Sep. 10, 2013

(54) OPTICAL RECEIVER AND OPTICAL RECEIVING METHOD

(75) Inventors: Hisao Nakashima, Kawasaki (JP); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 631 days.

(21) Appl. No.: 12/580,629

(22) Filed: Oct. 16, 2009

(65) Prior Publication Data
US 2010/0098411 A1 Apr. 22, 2010

(30) Foreign Application Priority Data
Oct. 17, 2008 (JP) .................... 2008-269220

(51) Int. Cl.
H04B 10/06 (2011.01)
(52) U.S. Cl.
USPC ............ 398/208; 398/202; 398/204; 398/205
(58) Field of Classification Search
USPC ......................................... 398/202–204, 211
See application file for complete search history.

(56) References Cited

U.S. PATENT DOCUMENTS

| 7,272,556 | B1* | 9/2007 | Aguilar et al. ................. 704/230 |
| 2005/0129058 | A1* | 6/2005 | Casaccia et al. ............... 370/464 |
| 2005/0196176 | A1* | 9/2005 | Sun et al. ....................... 398/152 |
| 2005/0238093 | A1* | 10/2005 | Payne et al. .................... 375/224 |
| 2006/0059276 | A1* | 3/2006 | Muth ............................... 710/15 |
| 2006/0129722 | A1* | 6/2006 | Campbell ...................... 710/106 |
| 2006/0140295 | A1* | 6/2006 | Jeong ............................. 375/260 |
| 2006/0159163 | A1* | 7/2006 | Kimura et al. ................. 375/225 |
| 2007/0238457 | A1* | 10/2007 | Wala .............................. 455/424 |
| 2008/0002977 | A1* | 1/2008 | Mori ................................ 398/71 |
| 2008/0081634 | A1* | 4/2008 | Kaikkonen et al. ......... 455/452.1 |
| 2008/0113628 | A1* | 5/2008 | Muhammad et al. ........... 455/77 |
| 2008/0279564 | A1* | 11/2008 | Han et al. ....................... 398/152 |
| 2008/0317109 | A1* | 12/2008 | Healey et al. ................. 375/226 |
| 2009/0207093 | A1* | 8/2009 | Anreddy et al. ............... 343/876 |
| 2010/0008679 | A1* | 1/2010 | Cole et al. ...................... 398/185 |
| 2010/0046641 | A1* | 2/2010 | Wala .............................. 375/241 |
| 2010/0092186 | A1* | 4/2010 | Takahara ....................... 398/208 |
| 2010/0098411 | A1* | 4/2010 | Nakashima et al. ............ 398/25 |
| 2010/0120386 | A1* | 5/2010 | Konstantinos et al. ..... 455/180.1 |
| 2010/0302084 | A1* | 12/2010 | Siahmakoun et al. ........ 341/137 |
| 2010/0329697 | A1* | 12/2010 | Koizumi et al. .............. 398/208 |
| 2011/0222866 | A1* | 9/2011 | Mashimo et al. ............. 398/202 |
| 2011/0229152 | A1* | 9/2011 | Hara et al. ..................... 398/202 |

FOREIGN PATENT DOCUMENTS

| JP | 10-70641 | 3/1998 |
| JP | 2000-138644 | 5/2000 |

OTHER PUBLICATIONS

Subcarrier. (2000). In Collins English Dictionary, 2000. Retrieved from http://www.credoreference.com/entry/hcengdict/subcarrier.*

(Continued)

*Primary Examiner* — Nathan Curs
*Assistant Examiner* — Tanya Ngo
(74) *Attorney, Agent, or Firm* — Staas & Halsey LLP

(57) ABSTRACT

An optical receiver includes a photo-detector that converts a received optical signal into an electric signal and outputs the electric signal, a converter that converts the electric signal into a parallel data signal and outputs the parallel data signal, and parallel-number changer changing a parallel number of the parallel data signal in accordance with a bit rate of the optical signal and outputting the parallel data signal having the changed parallel number.

14 Claims, 21 Drawing Sheets

(56) References Cited

OTHER PUBLICATIONS

Ly-Gagnon, Dany-Sebastien, et al., "Coherent Detection of Optical Quadrature Phase-Shift Keying Signals With Carrier Phase Estimation", Journal of Lightwave Technology, vol. 24, No. 1, pp. 12-21, Jan. 2006.

Crochiere, Ronald E., et al., "Interpolation and Decimation of Digital Signals—A Tutorial Review", Proceedings of the IEEE, vol. 69, No. 3, pp. 300-331, Mar. 1981.

Communication from the European Patent Office dated Feb. 16, 2010 and issued in the related European patent application.

Office Action issued by the Japanese Patent Office on Sep. 18, 2012 in the corresponding Japanese patent application No. 2008-269220.

* cited by examiner

OPTICAL RECEIVER AND OPTICAL RECEIVING METHOD

CROSS REFERENCE TO RELATED APPLICATION

This application is based upon and claims the benefit of priority of the prior Japanese Patent Application No. 2008-269220, filed on Oct. 17, 2008, the entire contents of which are incorporated herein by reference.

FIELD

Various embodiments described herein relate to optical receivers and optical receiving methods.

BACKGROUND

With the popularization of the Internet in recent years, a greater capacity in trunk-line optical communication systems is in demand. Optical transmitters-receivers that are capable of transmitting signals exceeding 40 Gbit/s or 100 Gbit/s per wavelength are being researched and developed.

However, increasing the transmission capacity (bit rate) per wavelength leads to a significant decrease in the optical-signal-verses-noise (OSNR) ratio, resulting in significant deterioration of signal quality due to waveform distortion caused by, for example, wavelength dispersion of transmission paths, polarization mode dispersion, or a nonlinear effect.

Therefore, for optical communication systems exceeding 40 Gbit/s, digital-coherent receiving methods that have great tolerance against the optical-signal-verses-noise (OSNR) ratio and the waveform distortion of transmission paths are attracting attention. For example, see Dany-Sebastien, Ly-Gagnon, et al., "Coherent Detection of Optical Quadrature Phase-Shift Keying Signals With Carrier Phase Estimation", Journal of Lightwave Technology, Vol. 24, No. 1, 2006, pp. 12-21.

In the receiving methods of the related art, the on/off states of the optical power are assigned to binary signals and are directly detected. In contrast, in a digital-coherent receiving method, the optical power and the phase information of light are extracted by a coherent receiving system, and the extracted optical power and phase information are quantized by an analog/digital converter (ADC) so as to be demodulated in a digital-signal processing circuit.

Since a digital-coherent receiving method allows for improved tolerance against the OSNR by the coherent receiving method as well as intensive waveform-distortion compensation by the digital-signal processing circuit, high performance can be achieved even in an optical transmitter-receiver with 40 Gbit/s or greater.

Furthermore, a digital-coherent receiving method can be combined with a modulation method in which multi-level information is transferrable in one symbol time. Known examples of such a modulation method include a multilevel modulation method, a polarization multiplexing method in which different pieces of information are multiplexed into orthogonal polarized waves, and a multicarrier multiplexing method in which different pieces of information are multiplexed into a plurality of frequencies (carriers) multiplexed at high density within a single wavelength grid. Typical examples of multicarrier multiplexing method include frequency division multiplexing (FDM) and orthogonal frequency division multiplexing (OFDM).

FIG. 24 illustrates a configuration example of a dual-polarization quadrature-phase-shift-keying (DP-QPSK) type digital-coherent optical transmitter-receiver (transceiver) that uses both the polarization multiplexing method in which different pieces of information are multiplexed into two orthogonal polarized waves (dual polarization) and a quadrature-phase-shift-keying (QPSK) method, which is a type of multilevel modulation method, in which quadrature information is transmitted in one symbol time.

An optical transmitter includes a transmission-signal generator 11, a signal light source (LD) 12, driver amplifiers 13 to 16, phase modulators 17 to 20, and a polarization beam combiner (PBC) 21, and transmits an optical signal to an optical receiver via a transmission path 22. The LD 12, the driver amplifiers 13 to 16, the phase modulators 17 to 20, and the PBC 21 constitute an electrical/optical conversion circuit 37.

The transmission-signal generator 11 outputs a transmission signal to the driver amplifiers 13 to 16. The driver amplifiers 13 to 16 amplify the transmission signal and output the amplified transmission signal to the phase modulators 17 to 20, respectively. The LD 12 outputs signal light to the phase modulators 17 to 20. The phase modulators 17 to 20 modulate the signal light with the transmission signal and output the signal light to the PBC 21. The light output from the phase modulators 17 and 18 and the light output from the phase modulators 19 and 20 have polarized waves that are orthogonal to each other. The PBC 21 combines the optical signals output from the phase modulators 17 to 20 and outputs the combined optical signal to the transmission path 22.

On the other hand, the optical receiver includes polarization beam splitters (PBSs) 23 and 24, a local light source (LD) 25, optical hybrids 26 and 27, photo-detectors (PDs) 28 to 31, ADCs 32 to 35, and a digital-signal processing circuit 36, and receives the optical signal from the transmission path 22. The PBSs 23 and 24, the LD 25, the optical hybrids 26 and 27, and the PDs 28 to 31 constitute a digital-coherent optical/electrical conversion circuit 38.

The PBS 23 splits the optical signal received from the transmission path 22 into two orthogonal polarized-wave components and outputs the two polarized-wave components to the optical hybrids 26 and 27, respectively. The PBS 24 splits local light output from the LD 25 into two orthogonal polarized-wave components and outputs the two polarized-wave components to the optical hybrids 26 and 27, respectively.

The optical hybrid 26 mixes the optical signal and the local light and outputs two orthogonal phase components to the PDs 28 and 29, respectively. Similarly, the optical hybrid 27 mixes the optical signal and the local light and outputs two orthogonal phase components to the PDs 30 and 31, respectively.

The PDs 28 and 29 perform photoelectric conversion to convert the optical signal into an electric signal and output the electric signal to the ADCs 32 and 33. Similarly, the PDs 30 and 31 convert the optical signal into an electric signal and output the electric signal to the ADCs 34 and 35. The digital signal output from the ADCs 32 and 33 includes the intensity information and the phase information of the optical signal input to the optical hybrid 26, and the digital signal output from the ADCs 34 and 35 includes the intensity information and the phase information of the optical signal input to the optical hybrid 27.

The digital-signal processing circuit 36 uses the digital signals output from the ADCs 32 to 35 to perform demodulation and waveform-distortion compensation on the received signals. This method of receiving polarized waves in two states is called polarization diversity reception. With the DP- QPSK method, transmission and reception of an optical signal can be performed by utilizing polarization diversity reception.

FIG. 25 illustrates a configuration example of a digital-coherent optical receiver that does not utilize polarization diversity reception. This optical receiver includes a polarization controller 41, an optical hybrid 42, an LD 43, PDs 44 and 45, ADCs 46 and 47, and a digital-signal processing circuit 48. The polarization controller 41, the optical hybrid 42, the LD 43, and the PDs 44 and 45 constitute a digital-coherent optical/electrical conversion circuit 49.

The polarization controller 41 changes the polarization state of a received optical signal so that it accords with the polarization state of local light output from the LD 43. The optical hybrid 42, the LD 43, the PDs 44 and 45, and the ADCs 46 and 47 operate in the same manner as the optical hybrid 26, the PDs 28 and 29, and the ADCs 32 and 33 illustrated in FIG. 24. The digital-signal processing circuit 48 uses digital signals output from the ADCs 46 and 47 to perform demodulation and waveform-distortion compensation on the received signals. In the case of a configuration that does not use polarization multiplexing, the reception may be performed using the configuration illustrated in FIG. 25.

A configuration illustrated in FIG. 26 may be used as an alternative to the configuration in FIG. 25. FIG. 26 illustrates a configuration example of a self-coherent optical receiver that does not use a local light source. This optical receiver includes an optical coupler 51, delay interferometers 52 and 53, PDs 54 to 56, ADCs 57 to 59, and a digital-signal processing circuit 60. The optical coupler 51, the delay interferometers 52 and 53, and the PDs 54 to 56 constitute a digital-coherent optical/electrical conversion circuit 61.

The optical coupler 51 divides a received optical signal into three components and outputs the three components to the delay interferometers 52 and 53 and the PD 56, respectively. The delay interferometers 52 and 53 extract phase components from the received optical signals by causing the optical signals to interfere with optical signals received earlier by one symbol time or a given time, and output the phase components to the PDs 54 and 55. The two phase components respectively output from the delay interferometers 52 and 53 are orthogonal to each other.

The PDs 54 to 56 convert the optical signal into an electric signal and output the electric signal to the ADCs 57 to 59. The digital-signal processing circuit 60 uses the digital signals output from the ADCs 57 to 59 to reconstitute the received optical signal, and performs demodulation and waveform-distortion compensation on the signal.

In addition to the QPSK method, other modulation methods can also be used in the digital-coherent optical receiver. Other examples of modulation methods include a non-return-to-zero (NRZ) modulation method, a return-to-zero (RZ) modulation method, an M-ary phase shift keying (M-PSK) modulation method, an M-ary quadrature amplitude modulation (M-QAM) method, an OFDM method, an FDM method, and a modulation method with a combination of these methods and polarization multiplexing.

As mentioned above, when the same transmission path is used, an increase in the bit rate per wavelength leads to deterioration in transmission performance. In particular, since an optical signal of 40 Gbit/s or greater has a large number of factors that can deteriorate the transmission performance due to an increase in bit rate, a trade-off between a greater transmission capacity per wavelength and the transmission distance becomes noticeable.

If an optical communication network can be made by flexibly selecting an optimal bit rate in accordance with the required transmission distance of the path and the condition of the path, an increase in a transmission capacity that is operable in the entire network can be expected.

However, in the related art, since the transmission characteristics significantly vary depending on each bit rate, an optical transmitter-receiver that can handle various bit rates is extremely expensive.

For example, a 10-Gbit/s optical transmitter-receiver employs an NRZ method. In contrast, in a 40-Gbit/s optical transmitter-receiver, the optical receiver requires an optical device used for compensating for waveform degradation, such as a wavelength-dispersion compensator or a PMD compensator, since the effect of waveform degradation caused by wavelength dispersion and polarization mode dispersion (PMD) is significant. In addition, in order to improve the OSNR tolerance, a phase modulation method such as a differential phase shift keying (DPSK) or a differential quadrature phase shift keying (DQPSK) is used as the modulation method.

In this case, it is assumed that an optical transmitter-receiver that can handle the two bit rates, 10 Gbit/s and 40 Gbit/s, is expensive.

On the other hand, a digital-coherent optical receiver is capable of compensating for linear distortion, such as wavelength dispersion of the transmission path or PMD, by using a digital-signal processing circuit, and the components other than the digital-signal processing circuit can have the same optical-receiver configuration regardless of the modulation method. Therefore, it is expected that the configuration of the optical receiver does not significantly change in accordance with the bit rate, whereby an optical transmitter-receiver that can handle various bit rates can be readily achieved.

However, in order for the digital-coherent optical receiver to have the capability to handle various bit rates, the following conditions need to be satisfied. Firstly, in order to handle various bit rates, a sampling clock source with a wide operational frequency range is required. Secondly, a digital-signal processing circuit that can operate even when the processing speed significantly varies is required. Thirdly, when the processing speed changes significantly, high-speed trackability with respect to a change in the quality of a received optical signal caused by polarization fluctuation or PMD fluctuation is required.

SUMMARY

An object of the various embodiments is to provide an optical receiver that can handle various bit rates.

An optical receiver includes a photo-detector that converts a received optical signal into an electric signal and outputs the electric signal, a converter that converts the electric signal into a parallel data signal and outputs the parallel data signal, and parallel-number changer changing a parallel number of the parallel data signal in accordance with a bit rate of the optical signal and outputting the parallel data signal having the changed parallel number.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF THE PREFERRED EMBODIMENTS

Various embodiments will be described below with reference to the drawings.

Figure 1:
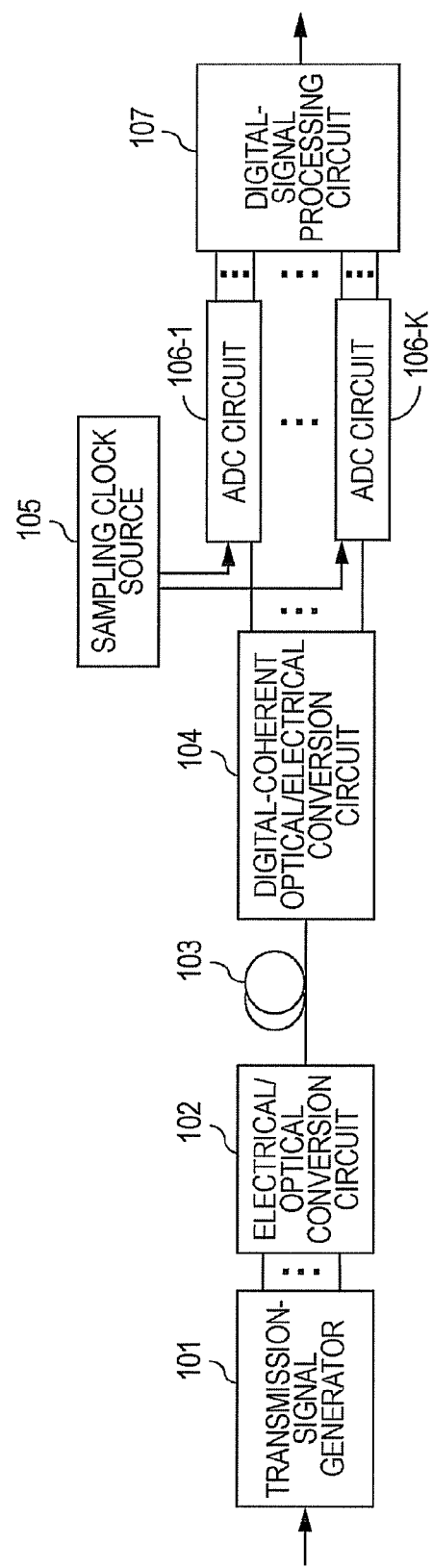
FIG. 1 is a schematic diagram illustrating a first digital-coherent optical transmitter-receiver.

FIG. 1 illustrates a configuration example of a digital-coherent optical transmitter-receiver according to an embodiment. An optical transmitter includes a transmission-signal generator 101 and an electrical/optical conversion circuit 102, and transmits an optical signal to an optical receiver via a transmission path 103.

The transmission-signal generator 101 generates a transmission signal from an input signal and outputs the transmission signal to the electrical/optical conversion circuit 102. The electrical/optical conversion circuit 102 generates an optical modulated signal from the transmission signal and outputs the optical modulated signal to the transmission path 103. In this case, the transmission-signal generator 101 changes the transmission signal in accordance with a required bit rate so as to handle various bit rates. As the electrical/optical conversion circuit 102, the electrical/optical conversion circuit 37 illustrated in FIG. 24, for example, may be used.

The optical receiver includes a digital-coherent optical/electrical conversion circuit 104, a sampling clock source 105, K ADC circuits 106-1 to 106-K, and a digital-signal processing circuit 107, and receives the optical signal from the transmission path 103.

The digital-coherent optical/electrical conversion circuit 104 generates an electric signal including the intensity information and the phase information of the received optical signal, and outputs the electric signal to the ADC circuits 106-1 to 106-K. The sampling clock source 105 generates a sampling clock signal with a fixed frequency regardless of the bit rate of an optical signal to be received, and outputs the sampling clock signal to the ADC circuits 106-1 to 106-K.

The ADC circuits 106 each include an ADC that samples an input signal in synchronization with the sampling clock signal and a demultiplexer that performs parallelization on a digital signal output from the ADC. The ADC circuit 106 then outputs the parallelized digital signal to the digital-signal processing circuit 107.

In this case, the parallel number (the channel number) of the digital signal is switched in accordance with the bit rate so that the output signal is always at the same data rate. Therefore, the parallel number of the output signal from the ADC circuit 106 is variable in accordance with the bit rate. For example, the higher the bit rate, the greater the parallel number, whereas the lower the bit rate, the smaller the parallel number. However, the physical number of signal lines does not change.

The digital-signal processing circuit 107 uses the digital signals output from the ADC circuits 106-1 to 106-K to perform demodulation and waveform-distortion compensation on the received signals, and then outputs a demodulated signal. The digital-signal processing circuit 107 operates at a processing rate that corresponds to the data rate of the output signal whether the parallel number of the ADC circuits 106 changes, and has a circuit configuration that operates even under a different parallel number.

Figure 24:
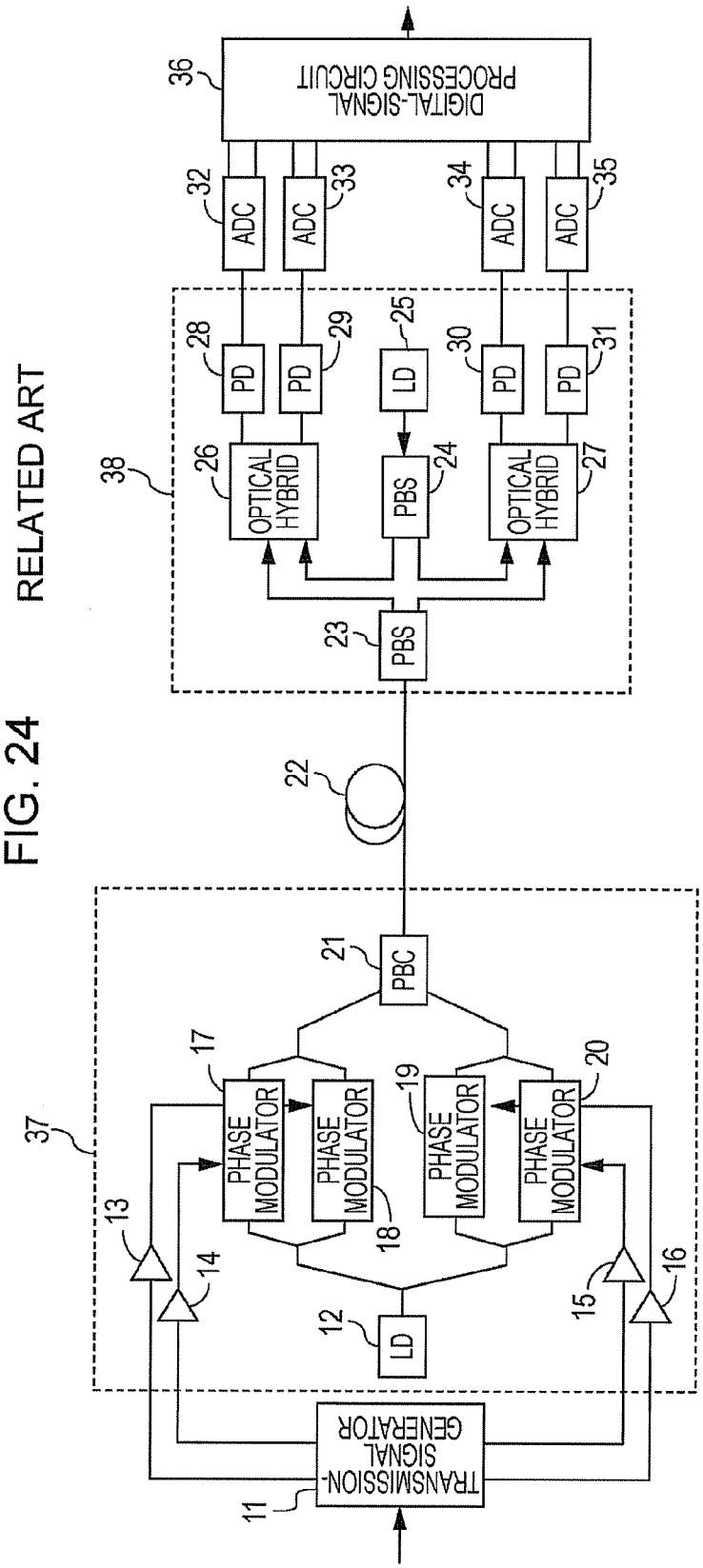
FIG. 24 is a schematic diagram illustrating a DP-QPSK-type digital-coherent optical transmitter-receiver of related art.
Figure 25:
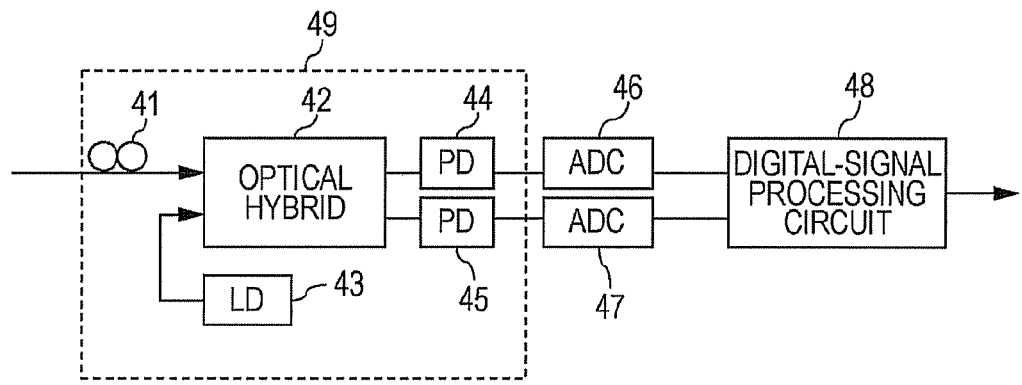
FIG. 25 is a schematic diagram illustrating a digital-coherent optical receiver of related art that does not utilize polarization diversity reception.
Figure 26:
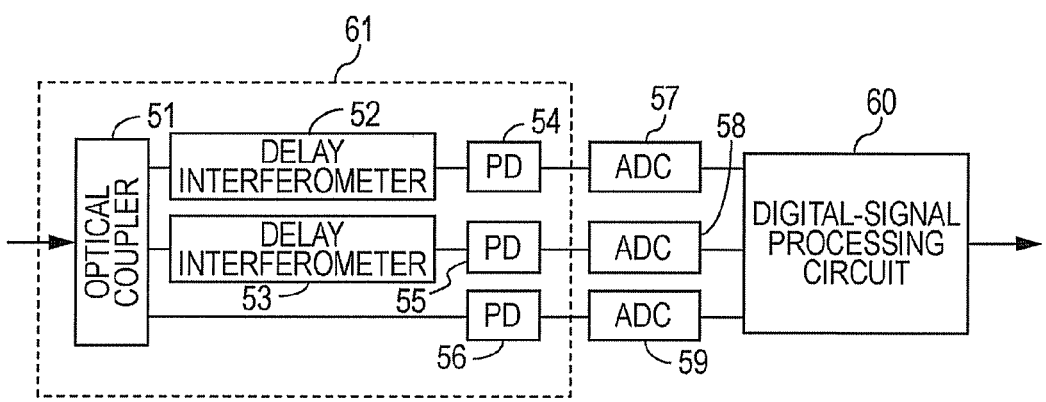
FIG. 26 is a schematic diagram illustrating a digital-coherent optical receiver of related art that does not use a local light source.

As the digital-coherent optical/electrical conversion circuit 104, for example, one of the digital-coherent optical/electrical conversion circuits 38, 49, and 61 illustrated in FIGS. 24, 25, and 26 may be used.

In the optical receiver, a fine adjustment of the sampling clock signal may sometimes be required due to the relationship between the bit rate and the parallel number of the ADC circuits 106. When generating a clock signal in synchronization with a received signal, it is necessary to provide the optical receiver with a clock recovery circuit so as to perform fine adjustment control on the frequency of the sampling clock source 105. If the operating frequency of the clock source is extremely narrow, it is necessary to prepare a plurality of clock sources in accordance with the bit rate to be supported.

By using the configuration as illustrated in FIG. 1, the optical receiver can handle various bit rates without having to significantly change the sampling frequency of the ADC circuits 106 or making the input data rate and the internal processing rate of the digital-signal processing circuit 107 adjustable.

Therefore, a sampling clock source with a wide operating frequency range is not necessary, and moreover, a digital-signal processing circuit that operates at various processing rates is also not necessary. Furthermore, a digital-signal processing circuit that has high-speed trackability with respect to a significant change in the processing rate is also not necessary.

This optical receiver can use any kind of modulation method, such as NRZ, RZ, M-PSK, M-QAM, OFDM, or FDM method, and can also use a modulation method with a combination of these methods and polarization multiplexing.

Figure 2:
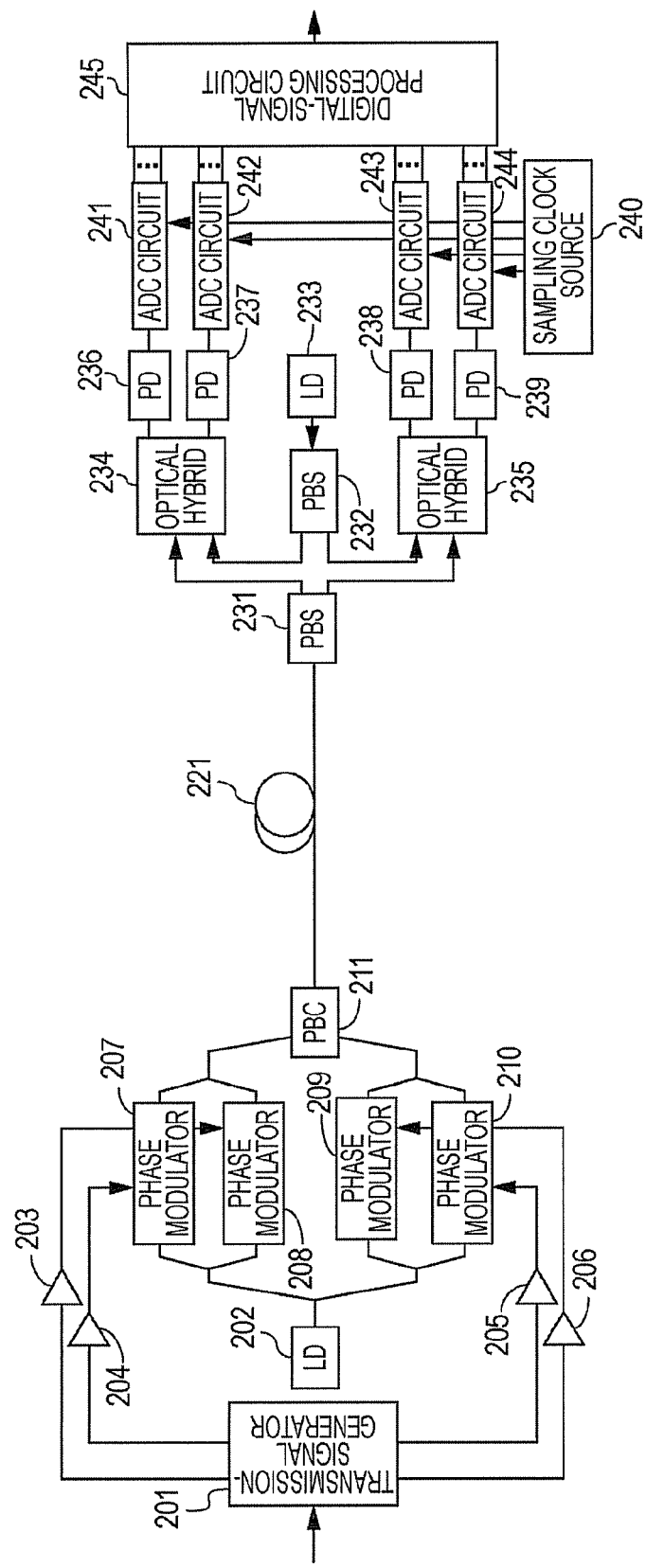
FIG. 2 is a schematic diagram illustrating a second digital-coherent optical transmitter-receiver.

FIG. 2 illustrates a configuration example of a digital-coherent optical transmitter-receiver that uses a DP-QPSK method as a modulation method. This digital-coherent optical transmitter-receiver is configured to operate at various bit rates.

The optical transmitter includes a transmission-signal generator 201, an LD 202, driver amplifiers 203 to 206, phase modulators 207 to 210, and a PBC 211, and transmits an optical signal to the optical receiver via a transmission path 221. The LD 202, the driver amplifiers 203 to 206, the phase modulators 207 to 210, and the PBC 211 constitute an electrical/optical conversion circuit.

The transmission-signal generator 201 generates a transmission signal from a four-channel (e.g., 10 G×4), two-channel (e.g., 20 G×2), or one-channel (e.g., 40 G×1) input signal and outputs the transmission signal to the driver amplifiers 203 to 206. The driver amplifiers 203 to 206 amplify the transmission signal and output the transmission signal to the phase modulators 207 to 210, respectively. The LD 202 outputs signal light to the phase modulators 207 to 210. The phase modulators 207 to 210 modulate the signal light with the transmission signal and output the signal light to the PBC 211. The light output from the phase modulators 207 and 208 and the light output from the phase modulators 209 and 210 have polarized waves that are orthogonal to each other. The PBC 211 combines the optical signals output from the phase modulators 207 to 210 and outputs the combined optical signal to the transmission path 221.

On the other hand, the optical receiver includes PBSs 231 and 232, an LD 233, optical hybrids 234 and 235, PDs 236 to 239, a sampling clock source 240, ADC circuits 241 to 244, and a digital-signal processing circuit 245, and receives the optical signal from the transmission path 221. The PBSs 231 and 232, the LD 233, the optical hybrids 234 and 235, and the PDs 236 to 239 constitute a digital-coherent optical/electrical conversion circuit.

The PBS 231 splits the optical signal received from the transmission path 221 into two orthogonal polarized-wave components and outputs the two polarized-wave components to the optical hybrids 234 and 235, respectively. The PBS 232 splits local light output from the LD 233 into two orthogonal polarized-wave components and outputs the two polarized-wave components to the optical hybrids 234 and 235, respectively.

The optical hybrid 234 mixes the optical signal and the local light and outputs two orthogonal phase components to the PDs 236 and 237, respectively. Similarly, the optical hybrid 235 mixes the optical signal and the local light and outputs two orthogonal phase components to the PDs 238 and 239, respectively.

The PDs 236 and 237 perform photoelectric conversion to convert the optical signal into an electric signal and output the electric signal to the ADC circuits 241 and 242, respectively.

Similarly, the PDs 238 and 239 convert the optical signal into an electric signal and output the electric signal to the ADC circuits 243 and 244, respectively. The sampling clock source 240 generates a sampling clock signal and outputs the sampling clock signal to the ADC circuits 241 to 244.

The ADC circuits 241 to 244 each sample an input signal in synchronization with the sampling clock signal and outputs a digital signal having a certain parallel number according to the bit rate to the digital-signal processing circuit 245. The digital-signal processing circuit 245 uses the digital signals output from the ADC circuits 241 to 244 to perform demodulation and waveform-distortion compensation on the received signals, and then outputs a demodulated signal.

The following is a description of an example of operations performed at two bit rates, 112 Gbit/s and 43 Gbit/s.

When an optical signal is to be transmitted at a bit rate of 112 Gbit/s, the transmission-signal generator 201 outputs a four-channel transmission signal at a bit rate of 28 Gbit/s. The electrical/optical conversion circuit generates a 112-Gbit/s optical signal from the four-channel transmission signal and outputs the optical signal to the transmission path 221.

The sampling clock source 240 of the optical receiver generates a 56-GHz clock signal, and the ADC circuits 241 to 244 each perform sampling at 56 GHz and output a digital signal (data signal) with a parallel number of 4 to the digital-signal processing circuit 245. In this case, the data rate of the data signal to be input to the digital-signal processing circuit 245 is 14 GHz.

On the other hand, when an optical signal is to be transmitted at a bit rate of 43 Gbit/s, the transmission-signal generator 201 outputs a four-channel transmission signal at a bit rate of 10.75 Gbit/s. The electrical/optical conversion circuit generates a 43-Gbit/s optical signal from the four-channel transmission signal and outputs the optical signal to the transmission path 221.

The sampling clock source 240 of the optical receiver generates a 57.3-GHz clock signal, and the ADC circuits 241 to 244 each perform sampling at 57.3 GHz and output a data signal with a parallel number of 3 to the digital-signal processing circuit 245. In this case, the data rate of the data signal to be input to the digital-signal processing circuit 245 is 14.3 GHz.

Figure 3:
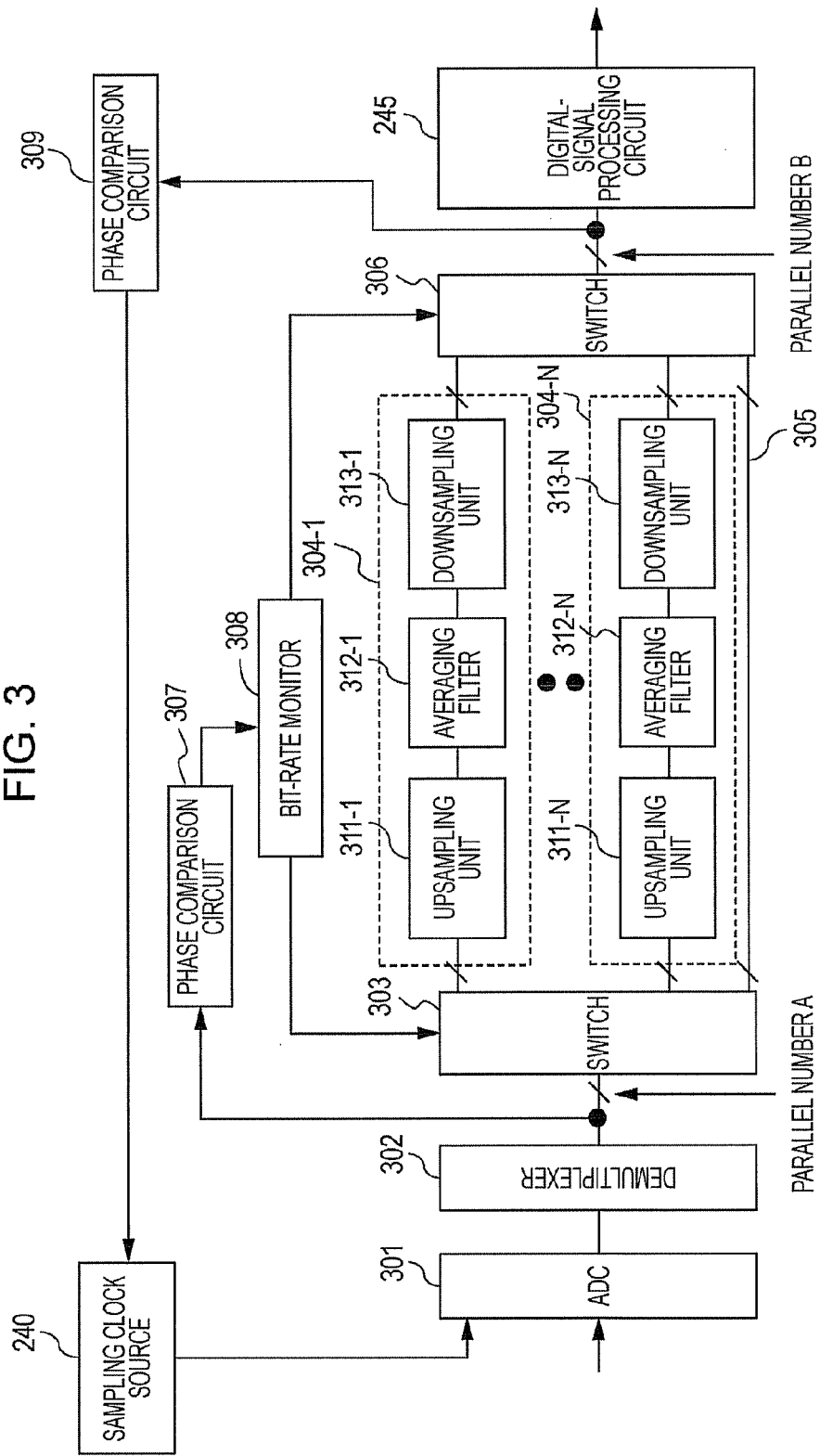
FIG. 3 is a schematic diagram illustrating a first ADC circuit.

FIG. 3 illustrates a configuration example of the ADC circuits 241 to 244 illustrated in FIG. 2. Each ADC circuit includes an ADC 301, a demultiplexer 302, switches 303 and 306, N sampling-rate converters 304-1 to 304-N (N≧1), a through-port 305, phase comparison circuits 307 and 309, and a bit-rate monitor 308.

Each sampling-rate converter 304-$i$ ($i$=1 to N) includes an upsampling unit 311-$i$, an averaging filter 312-$i$, and a downsampling unit 313-$i$. The parallel number of a parallel data signal output from the demultiplexer 302 is A, and the parallel number of a parallel data signal output from the switch 306 is B.

The ADC 301 samples an input signal in synchronization with a clock signal supplied from the sampling clock source 240 and outputs the signal to the demultiplexer 302. The demultiplexer 302 converts the output signal from the ADC 301 into a parallel data signal with a parallel number of A and outputs the parallel data signal to the switch 303 and the phase comparison circuit 307.

The switch 303 selects a path from one of the sampling-rate converters 304-1 to 304-N and the through-port 305 in accordance with a control signal from the bit-rate monitor 308 and outputs the A data signals to the selected path.

The sampling-rate converters 304 each change the sampling rate of the data signal so as the change the parallel number of the data signal from A to B, and output the B data signals to the switch 306. The changed parallel number B becomes different values in accordance with the corresponding sampling-rate converters 304. The through-port 305 directly outputs the data signal to the switch 306 without changing the parallel number of the data signal.

The switch 306 selects a path from one of the sampling-rate converters 304-1 to 304-N and the through-port 305 in accordance with a control signal from the bit-rate monitor 308 and outputs B data signals output from the selected path to the digital-signal processing circuit 245 and the phase comparison circuit 309. If the through-port 305 is selected, B=A.

The phase comparison circuit 307 uses the data signal output from the demultiplexer 302 to detect a phase difference (sampling phase) between the sampling clock signal, not yet undergone sampling rate conversion, and the data signal, and outputs the sampling phase to the bit-rate monitor 308. The bit-rate monitor 308 estimates the bit rate from the amount of change per unit time of the sampling phase output from the phase comparison circuit 307 and the frequency of the sampling clock signal of the sampling clock source 240. Then, the bit-rate monitor 308 outputs a control signal according to the estimated bit rate to the switches 303 and 306.

Consequently, the switches 303 and 306 can select, from the sampling-rate converters 304-1 to 304-N and the through-port 305, a path that corresponds to the bit rate of the input signal. By selecting a sampling-rate converter 304 that corresponds to the bit rate, the parallel number B of the data signal can be changed such that the data rate is always fixed at the input terminal of the digital-signal processing circuit 245. If the conversion of the sampling rate is not necessary, the through-port 305 is selected.

The phase comparison circuit 309 uses the data signal output from the switch 306 to detect a phase difference (sampling phase) between the sampling clock signal, having undergone sampling rate conversion, and the data signal, and outputs the sampling phase to the sampling clock source 240. The sampling clock source 240 performs a fine adjustment of the clock frequency on the basis of the sampling phase output from the phase comparison circuit 309. Consequently, the phase of the signal whose parallel number has been changed (having undergone sampling rate conversion) and the phase of the sampling clock signal can be synchronized with each other.

Instead of providing the phase comparison circuit 309, the same process may be performed within the digital-signal processing circuit 245 after the waveform-distortion compensation, and the phase difference between the sampling clock signal and the data signal may be output from the digital-signal processing circuit 245 to the sampling clock source 240. Furthermore, instead of synchronizing the sampling clock signal of the sampling clock source 240 with the data signal, the synchronization may be performed within the digital-signal processing circuit 245.

Figure 4:
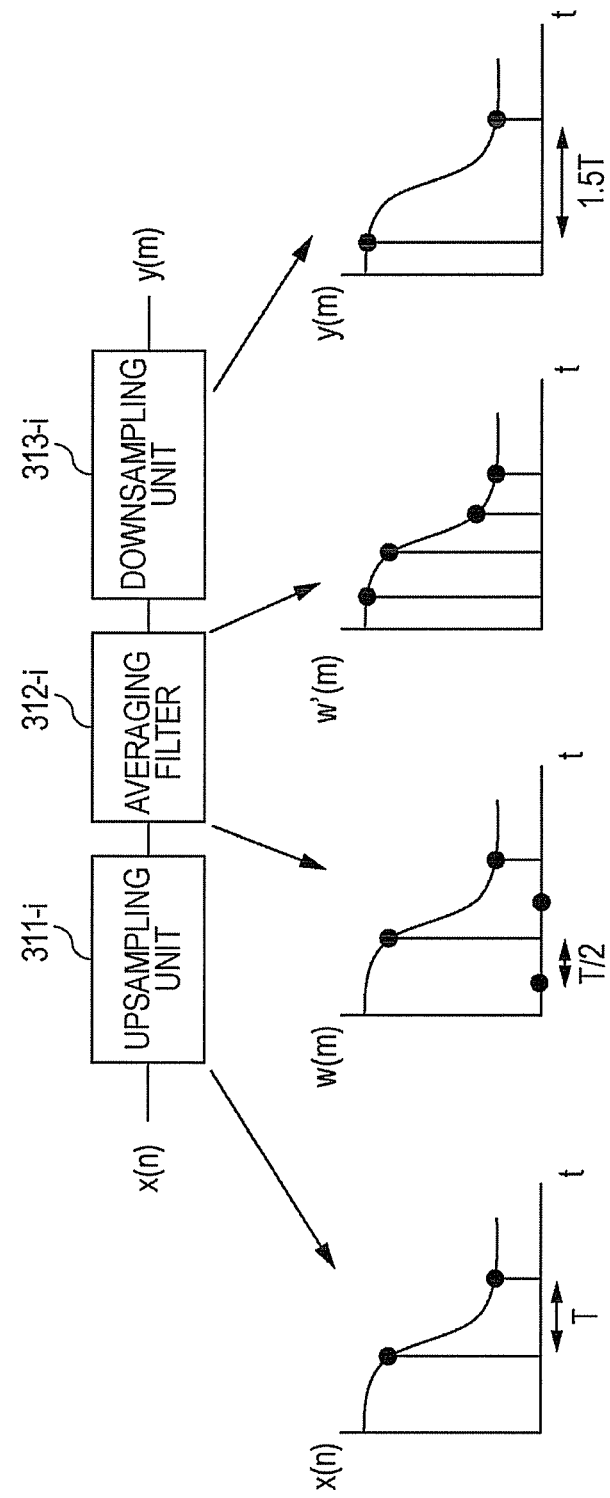
FIG. 4 illustrates the operation of a sampling-rate converter.

FIG. 4 illustrates an operational example of the sampling-rate converter 304-$i$ illustrated in FIG. 3. In this example, the sampling rate of a data signal is changed to 2/3 thereof.

The upsampling unit 311-$i$ resamples an input data signal x(n) with a sampling rate that is twice the value of x(n) and generates a data signal w(m) on the basis of the following equations.

$$w(m)=x(m/L)\ (m=0,\ \pm L,\ \pm 2L,\ \ldots)$$

$$w(m)=0\ (m\neq 0,\ \pm L,\ \pm 2L,\ \ldots)$$

The value x(n) indicates an input data signal at time n, and w(m) indicates a resampled data signal at time m. L indicates an upsampling rate. In this example, L=2. Consequently, the sampling period of a data signal is changed from T to T/2.

The averaging filter 312-$i$ averages the data signal w(m) so as to generate a data signal w'(m). The downsampling unit 313-$i$ resamples the data signal w'(m) with a sampling rate that is 1/3 of w'(m) so as to generate a data signal y(m). In this case, the downsampling rate is 1/3.

In this manner, the sampling rate of a data signal is changed to 2/3 of the input data signal x(n), and the sampling period is changed from T to 1.5 T.

Generally, by appropriately setting the upsampling rate of the upsampling unit 311-$i$ and the downsampling rate of the downsampling unit 313-$i$, the sampling rate of a data signal can be changed to a desired value.

Figure 5:
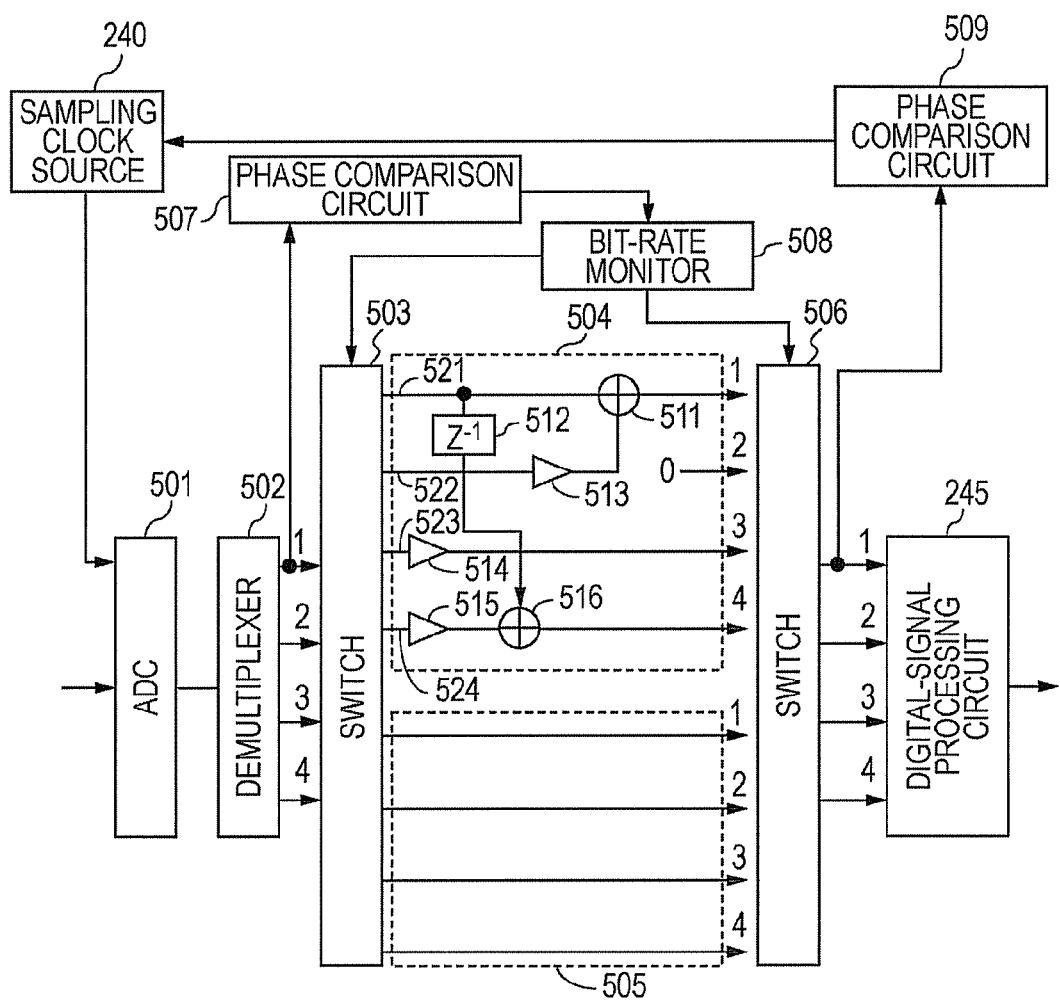
FIG. 5 is a schematic diagram illustrating a second ADC circuit.

FIG. 5 illustrates a configuration example of the ADC circuits 241 to 244 when operations are performed at two bit rates, 112 Gbit/s and 43 Gbit/s. This configuration corresponds to a case where the number N of sampling-rate converters 304 in the configuration illustrated in FIG. 3 is 1.

Each ADC circuit includes an ADC 501, a demultiplexer 502, switches 503 and 506, a sampling-rate converter 504, a through-port 505, phase comparison circuits 507 and 509, and a bit-rate monitor 508.

The sampling-rate converter 504 includes adders 511 and 516, a delay unit 512, and multipliers 513 to 515. This configuration is equivalent to a circuit formed by optimizing filter coefficients and circuits of the upsampling unit 311-$i$, the averaging filter 312-$i$, and the downsampling unit 313-$i$ illustrated in FIG. 3 in accordance with an assumed bit rate.

The ADC 501 samples an input signal in synchronization with a clock signal supplied from the sampling clock source 240 and outputs the signal to the demultiplexer 502. The demultiplexer 502 converts the output signal from the ADC 501 into a parallel data signal with a parallel number of 4 and outputs the parallel data signal to the switch 503.

The switch 503 selects a path from either the sampling-rate converter 504 or the through-port 505 in accordance with a control signal from the bit-rate monitor 508 and outputs the four data signals to the selected path.

The sampling-rate converter 504 changes the sampling rate of the data signal to 3/4. In this case, the multiplier 513 multiplies a data signal 522 by 2 and outputs the product to the adder 511. The adder 511 adds a data signal 521 and the output signal from the multiplier 513 together and outputs the sum to the switch 506.

The delay unit 512 delays the data signal 521 by one clock and outputs the delayed data signal 521 to the adder 511. The multiplier 514 multiplies a data signal 523 by 3 and outputs the product to the switch 506. The multiplier 515 multiplies a data signal 524 by 2 and outputs the product to the adder 516. The adder 516 adds the output signal from the delay unit 512 and the output signal from the multiplier 515 together and outputs the sum to the switch 506.

In this manner, the parallel number of the data signal is changed from 4 to 3, and the three data signals are output to the switch 506. The sampling-rate converter 504 is physically provided with four output signal lines, and a logical value "0" is constantly output from the second non-used signal line.

The through-port 505 directly outputs the data signal to the switch 506 without changing the parallel number of the data signal.

The switch 506 selects a path from either the sampling-rate converter 504 or the through-port 505 in accordance with a control signal from the bit-rate monitor 508 and outputs the three or four data signals output from the selected path to the digital-signal processing circuit 245. The three or four data signals are also output to the phase comparison circuit 507.

The phase comparison circuit 507 uses the data signal output from the demultiplexer 502 to detect a sampling phase and outputs the sampling phase to the bit-rate monitor 508. The bit-rate monitor 508 estimates the bit rate from the amount of change per unit time of the sampling phase output from the phase comparison circuit 507 and the frequency of the sampling clock signal of the sampling clock source 240. Then, the bit-rate monitor 508 outputs a control signal according to the estimated bit rate to the switches 503 and 506.

The phase comparison circuit 509 uses the data signal output from the switch 506 to detect a sampling phase and outputs the sampling phase to the sampling clock source 240. The sampling clock source 240 performs a fine adjustment of the clock frequency on the basis of the sampling phase output from the phase comparison circuit 509.

When the bit rate is 112 Gbit/s, the switches 503 and 506 select the through-port 505. In this case, the ADC 501 samples an input signal in synchronization with a 56-GHz clock signal supplied from the sampling clock source 240. The demultiplexer 502 outputs a four-channel 14-GHz data signal to the switch 503. Consequently, the four-channel 14-GHz data signal is output to the digital-signal processing circuit 245.

On the other hand, when the bit rate is 43 Gbit/s, the switches 503 and 506 select the sampling-rate converter 504. In this case, the sampling clock source 240 changes the clock frequency to 57.3 GHz by finely adjusting the clock frequency. Alternatively, the clock frequency may be automatically changed by the phase comparison circuit 509. The ADC 501 samples an input signal in synchronization with a 57.3-GHz clock signal. The demultiplexer 502 outputs a four-channel 14.3-GHz data signal to the switch 503. The sampling-rate converter 504 changes the channel number of the data signal from 4 to 3 and outputs the data signal to the switch 506. Consequently, a three-channel 14.3-GHz data signal is output to the digital-signal processing circuit 245.

Although a 4:3 sampling-rate converter is illustrated in the ADC circuit in FIG. 5, sampling-rate converters of other magnification ratios may be used in a similar manner.

Although the bit rate of an input signal is automatically monitored within an ADC circuit in the configurations illustrated in FIGS. 3 and 5, the bit rate information may alternatively be given from the outside of the ADC circuit.

For example, when a network control device that monitors the condition of an optical communication network holds the current bit rate information, the optical transmitter and the optical receiver can both be informed of the bit rate information. In this case, the ADC circuits 241 to 244 change the switches in accordance with the informed bit rate information, and the sampling clock source 240 finely adjusts the clock frequency in accordance with the informed bit rate information. If the clock frequency can be automatically changed by the phase comparison circuit 509, the fine adjustment by the sampling clock source 240 is not necessary.

Figure 6:
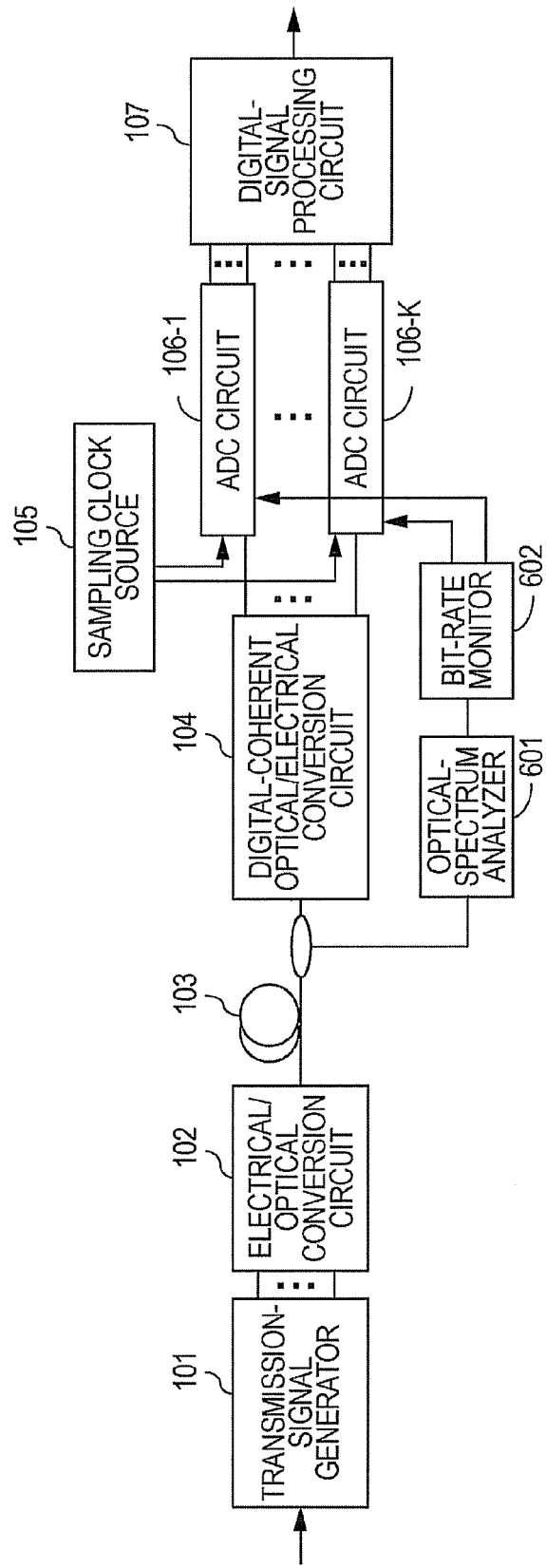
FIG. 6 is a schematic diagram illustrating a third digital-coherent optical transmitter-receiver.

The optical receiver can measure the optical spectrum of the received optical signal and estimate the bit rate from the spectrum shape. FIG. 6 illustrates a configuration example of an optical receiver that performs such bit-rate estimation. This optical receiver has the basic configuration illustrated in FIG. 1 in addition to an optical-spectrum analyzer 601 and a bit-rate monitor 602.

The optical-spectrum analyzer 601 measures the optical spectrum of the optical signal received from the transmission path 103 and outputs information indicating the spectrum shape, such as the spectrum width, to the bit-rate monitor 602. The bit-rate monitor 602 estimates the bit rate from a change in the spectrum shape and outputs a control signal according to the estimated bit rate to the ADC circuits 106-1 to 106-K. Each ADC circuit changes the switches in accordance with the control signal output from the bit-rate monitor 602.

Figure 7:
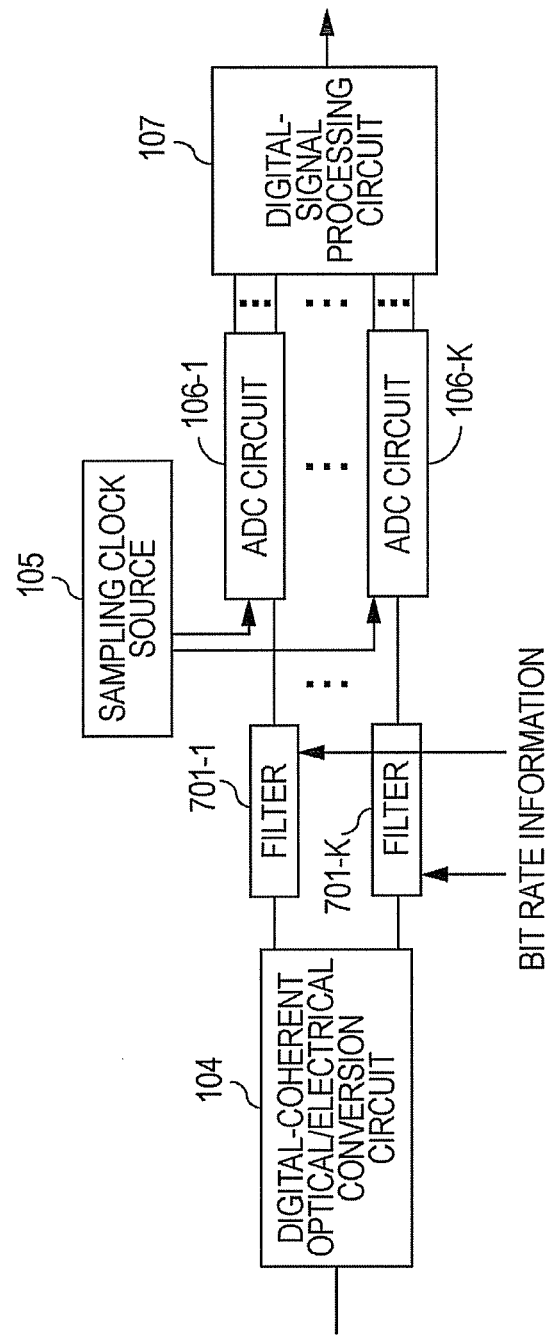
FIG. 7 is a schematic diagram illustrating a digital-coherent optical receiver having anti-aliasing filters.

FIG. 7 illustrates a configuration example in which the optical receiver is provided with anti-aliasing filters for minimizing aliasing caused by quantization. This optical receiver has the basic configuration illustrated in FIG. 1 in addition to anti-aliasing filters 701-1 to 701-K.

The digital-coherent optical/electrical conversion circuit 104 outputs an electric signal including the intensity information and the phase information of a received optical signal to the filters 701-1 to 701-K. The filters 701-1 to 701-K filter the electric signal and output the filtered electric signal to the ADC circuits 106-1 to 106-K, respectively. Each filter 701 changes the filter band in accordance with bit rate information obtained by one of the above-described methods.

According to this configuration, aliasing can be minimized by using filter bands suitable for the respective bit rates.

Figure 8:
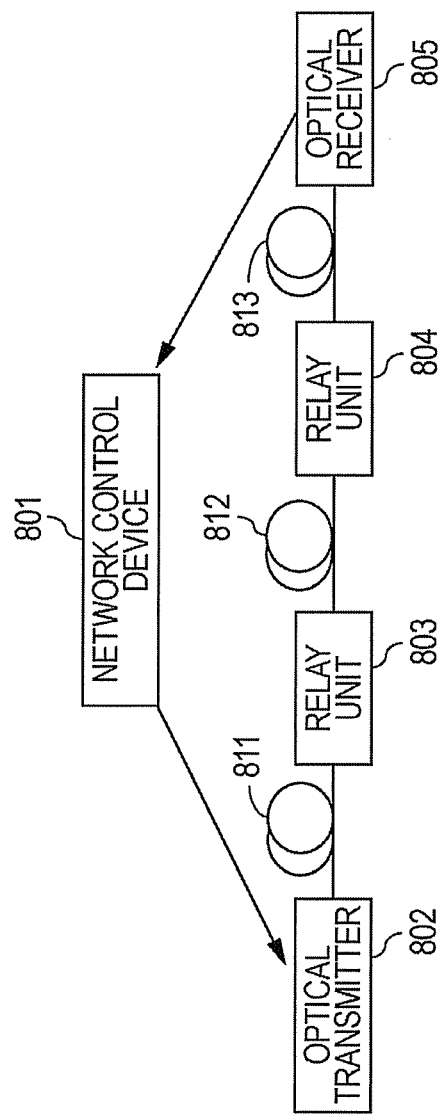
FIG. 8 is a schematic diagram illustrating a digital-coherent optical communication system.

FIG. 8 illustrates a configuration example of an optical communication system that uses a digital-coherent optical transmitter-receiver according to an embodiment. This optical communication system includes a network control device 801, an optical transmitter 802, repeaters 803 and 804, an optical receiver 805, and transmission paths 811 to 813.

An optical signal output from the optical transmitter 802 travels through the transmission path 811, the repeater 803, the transmission path 812, the repeater 804, and the transmission path 813 so as to enter the optical receiver 805. In an actual optical communication system, the optical signal is transmitted via a larger number of transmission paths and repeaters.

The optical receiver 805 monitors the reception quality of an optical signal on the basis of, for example, a bit error rate and the OSNR, and informs the network control device 801 of the monitored reception quality. If there is a large number of repeaters in the transmission interval, for example, the quality of received optical signal deteriorates. In light of this, if the informed reception quality from the optical receiver 805 does not satisfy the predetermined quality, the network control device 801 sends a bit-rate change command to the optical transmitter 802.

When the optical transmitter 802 receives the bit-rate change command, the optical transmitter 802 changes the current bit rate to a lower bit rate. In consequence, the bit rate of the optical communication system can be flexibly changed, whereby the transmission capacity of the overall network can be optimized.

If the optical receiver has a performance monitor function for received signals to improve the receptability of optical signals, the condition of the transmission paths 811 to 813 can be collected. Thus, the network control device 801 can monitor the condition of the transmission paths and the network with higher accuracy.

The optical receiver 805 may alternatively inform the optical transmitter 802 of the reception quality instead of informing the network control device 801 of the reception quality. If the informed reception quality does not satisfy the predetermined quality, the optical transmitter 802 changes the current bit rate to a lower bit rate.

A monitor control signal that connects between the repeaters may be used for the communication between the optical receiver 805 and the optical transmitter 802. In the case of a bidirectional communication network, the bit rate in the downstream direction may be changed when signal receptability in the upstream direction cannot be obtained, and the optical transmitter 802 may be informed of the reception quality using an optical signal in the downstream direction.

Figure 9:
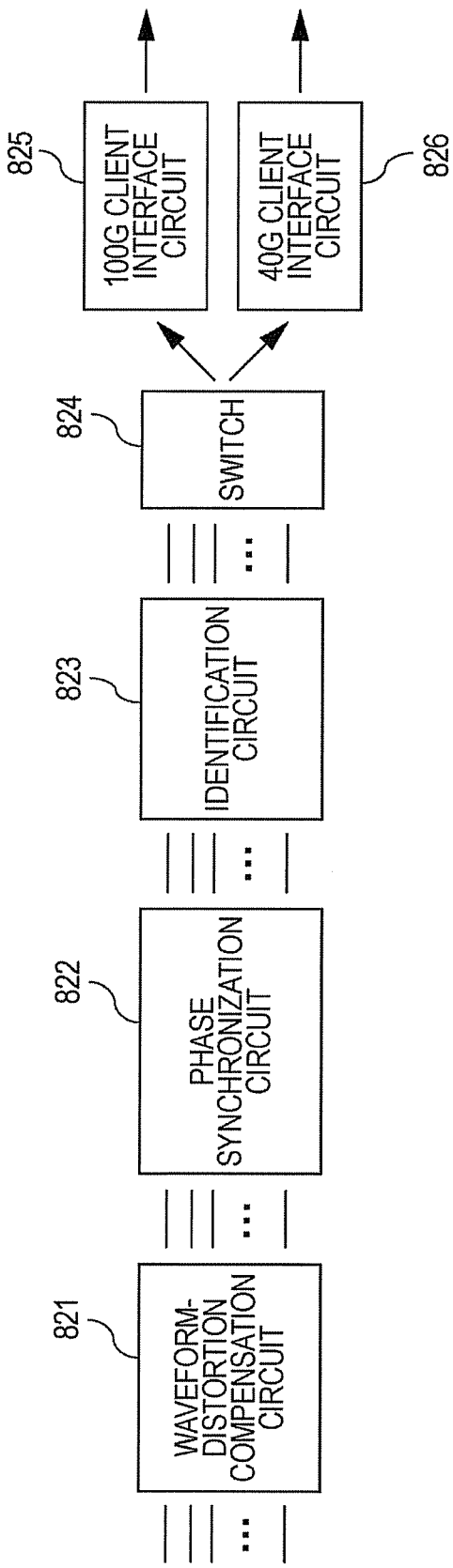
FIG. 9 is a schematic diagram illustrating a digital-signal processing circuit.

FIG. 9 illustrates a configuration example of the digital-signal processing circuits 107 and 245. The digital-signal processing circuit illustrated in FIG. 9 includes a waveform-distortion compensation circuit 821, a phase synchronization circuit 822, an identification circuit 823, a switch 824, a 100 G client interface circuit 825, and a 40 G client interface circuit 826.

The waveform-distortion compensation circuit 821 compensates for waveform distortion caused by, for example, wavelength dispersion in an optical fiber, polarization mode dispersion, or polarization fluctuation.

Figure 10:
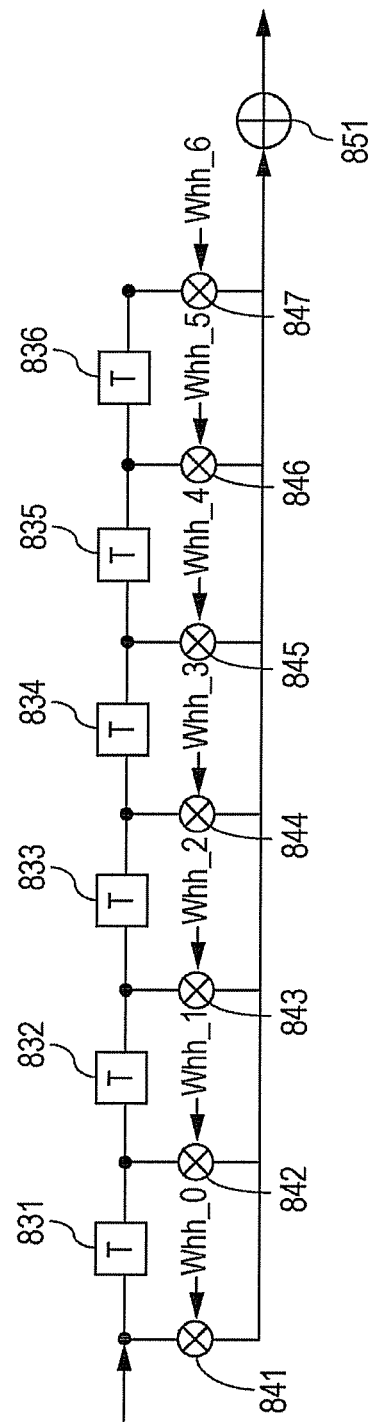
FIG. 10 is a schematic diagram illustrating a waveform-distortion compensation circuit.

FIG. 10 illustrates a configuration example of the waveform-distortion compensation circuit 821. The waveform-distortion compensation circuit 821 is achieved by using, for example, an FIR filter illustrated in FIG. 10. The FIR filter includes delay units 831 to 836, tap-coefficient multipliers 841 to 847, and an adder 851.

Although the parallel number of a data signal to be received is changed when the bit rate is changed, a signal on a non-used signal line (lane) may be set to a logical value "0" so that, even though the number of taps decreases, the same circuit can be used even when the parallel number is changed.

The phase synchronization circuit 822 is a circuit for synchronizing the optical frequencies and the optical phases of a received optical signal and local light and is configured to restore the intensity and phase information of an optical signal transmitted from the transmitter.

Figure 11:
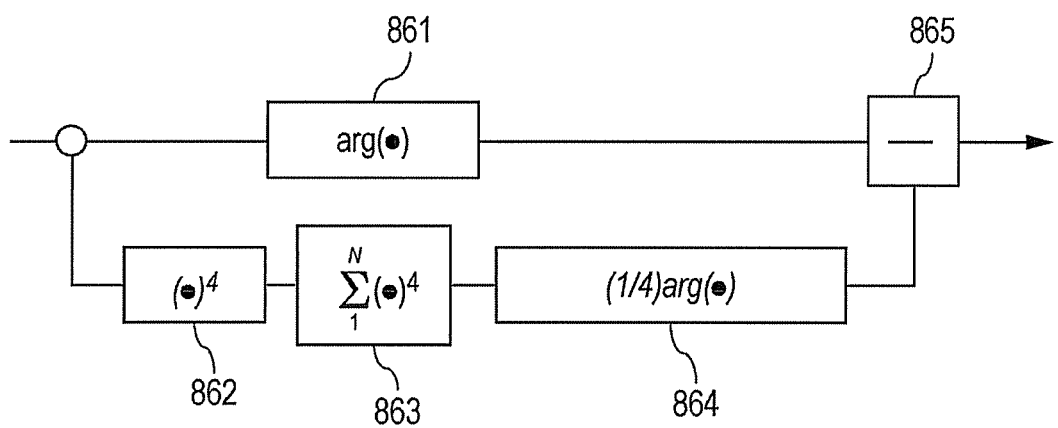
FIG. 11 is a schematic diagram illustrating a phase synchronization circuit.

FIG. 11 illustrates a configuration example of the phase synchronization circuit 822 when QPSK modulation is used. The phase synchronization circuit illustrated in FIG. 11 includes computing units 861 to 864 and a subtractor 865.

Similar to the case of an FIR filter, although the parallel number of a data signal to be received is changed when the bit rate is changed, a signal on a non-used signal line may be set to a logical value "0" so that the same circuit can be used even when the parallel number is changed.

From the intensity and the phase information restored by the phase synchronization circuit 822, the identification circuit 823 demodulates a signal on the basis of a modulation method. In the identification circuit 823, an independent identification circuit is disposed for each signal line so that there is no need for changing circuits when the parallel number is changed.

The switch 824 selects either the 100 G client interface circuit 825 or the 40 G client interface circuit 826 in accordance with the bit rate information and outputs a demodulated signal to the selected interface circuit.

The interface circuits 825 and 826 transmit the demodulated signal towards the client on the basis of the interface determined in accordance with the bit rate.

Figure 12:
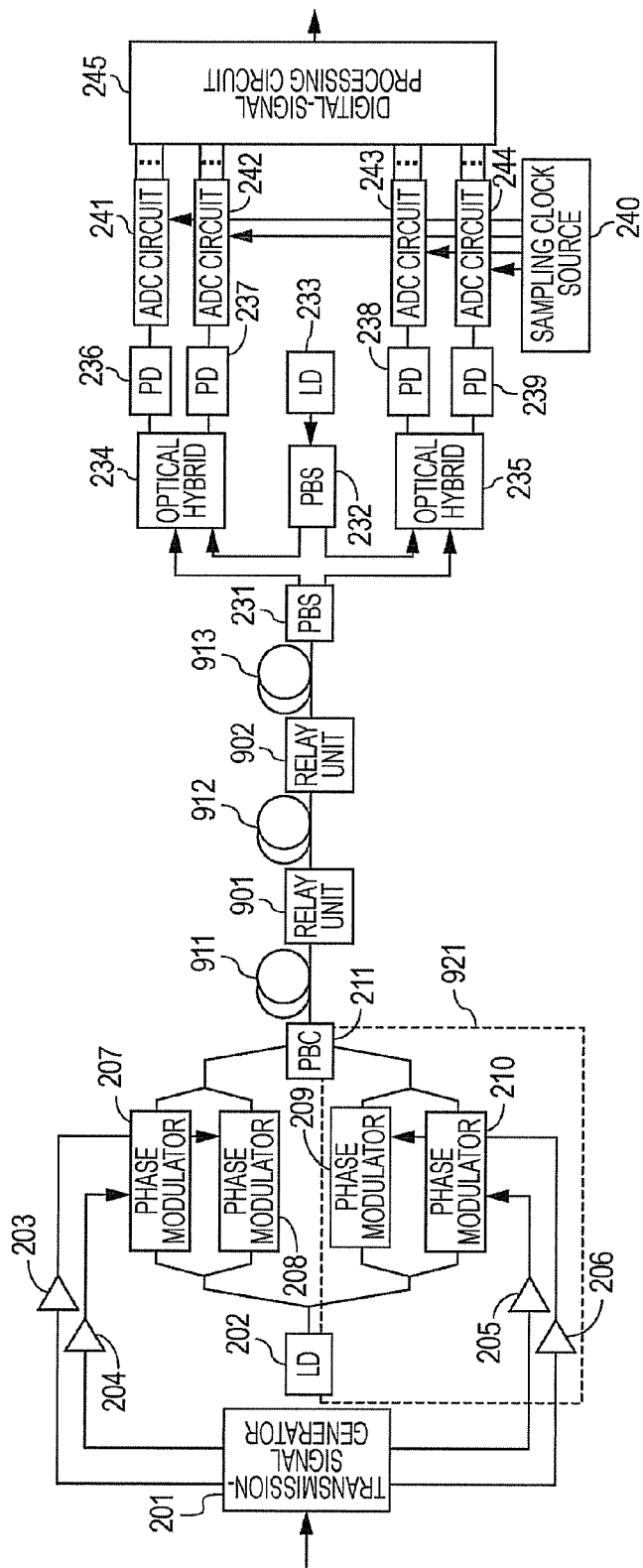
FIG. 12 illustrates how a second digital-coherent optical transmitter-receiver is used.

FIG. 12 illustrates another method of using the digital-coherent optical transmitter-receiver illustrated in FIG. 2. In this example, the transmission path 221 illustrated in FIG. 2 is replaced by repeaters 901 and 902 and transmission paths 911 to 913.

The following is a description of an example of operations performed at two bit rates, 112 Gbit/s and 43 Gbit/s. The operation performed by the optical transmitter-receiver when transmitting an optical signal at a bit rate of 112 Gbit/s is the same as that in FIG. 2.

When an optical signal is to be transmitted at a bit rate of 43 Gbit/s, the optical transmitter generates a 43-Gbit/s optical signal without using polarization multiplexing. In this case, a circuit section surrounded by a dash line 921 is not used. The optical transmitter turns off the power of the polarization-channel driver amplifiers 205 and 206, which are not to be used, and sets the bias of the phase modulators 209 and 210 such that the output optical signal is in an off state.

The transmission-signal generator 201 outputs a two-channel transmission signal at a bit rate of 21.5 Gbit/s to the driver amplifiers 203 and 204. The phase modulators 207 and 208 modulate local light with the transmission signal and output the modulated local light to the PBC 211. The PBC 211 combines optical signals output from the phase modulators 207 and 208 and outputs a 43-Gbit/s optical signal to the transmission path 911. The operation of the optical receiver in this case is the same as that in FIG. 2.

The method of using the optical transmitter in this manner is effective not only when the OSNR of the received signal does not satisfy a required value, but also when the polarization-dependent-loss (PDL) characteristics in the transmission interval are poor. When the bit rate required in an optical path as a network is 43 Gbit/s, the power consumption can be expected to be effectively reduced by using only one of the polarization channels.

Figure 13:
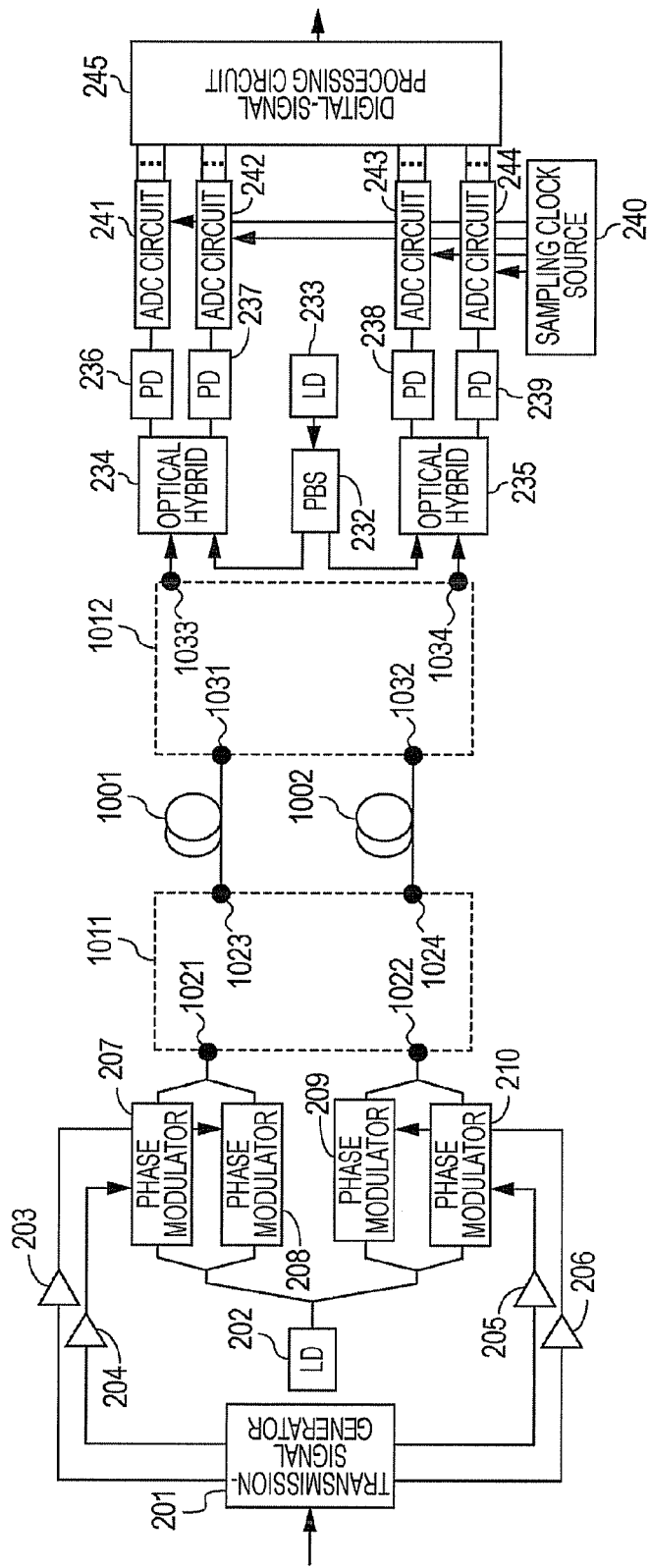
FIG. 13 is a schematic diagram illustrating a fourth digital-coherent optical transmitter-receiver.

FIG. 13 is a configuration example of another digital-coherent optical transmitter-receiver. The optical transmitter in FIG. 13 has a configuration equivalent to the configuration of the optical transmitter illustrated in FIG. 2 without the PBC 211. The optical receiver in FIG. 13 has a configuration equivalent to the configuration of the optical receiver illustrated in FIG. 2 without the PBS 231.

The optical transmitter is connected to a secondary transmission path 1001 and a primary transmission path 1002 via a connector section 1011. The secondary transmission path 1001 and the primary transmission path 1002 are connected to the optical receiver via a connector section 1012.

Output terminals of the phase modulators 207 and 208 are connected to an input terminal 1021 of the connector section 1011, and output terminals of the phase modulators 209 and 210 are connected to an input terminal 1022 of the connector section 1011. Output terminals 1023 and 1024 of the connector section 1011 are respectively connected to the transmission path 1001 and the transmission path 1002.

On the other hand, input terminals 1031 and 1032 of the connector section 1012 are respectively connected to the transmission path 1001 and the transmission path 1002. An output terminal 1033 of the connector section 1012 is connected to the optical hybrid 234, and an output terminal 1034 of the connector section 1012 is connected to the optical hybrid 235.

The following is a description of an example of operations performed at two bit rates, 112 Gbit/s and 43 Gbit/s.

Figure 14:
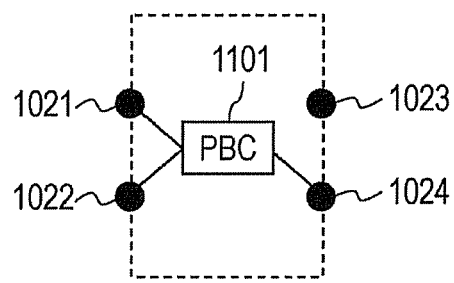
FIG. 14 is a schematic diagram illustrating a first connector section.
Figure 15:
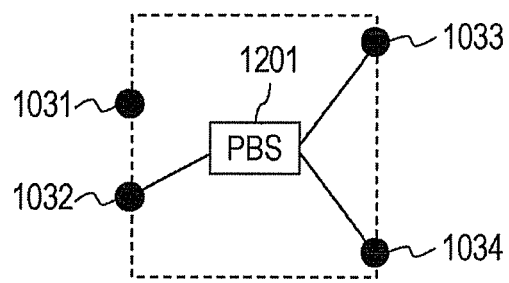
FIG. 15 is a schematic diagram illustrating a second connector section.

When an optical signal is to be transmitted at a bit rate of 112 Gbit/s, the connector sections 1011 and 1012 have configurations as illustrated in, for example, FIGS. 14 and 15. The connector section 1011 includes a PBC 1101. The input terminals 1021 and 1022 are connected to an input terminal of the PBC 1101, and the output terminal 1024 is connected to an output terminal of the PBC 1101. The connector section 1012 includes a PBS 1201. The input terminal 1032 is connected to an input terminal of the PBS 1201, and the output terminals 1033 and 1034 are connected to an output terminal of the PBS 1201.

Therefore, the transmission path 1001 is not used, and an optical signal is transmitted using only the transmission path 1002. The operation of the optical transmitter-receiver in this case is the same as that in FIG. 2.

Figure 16:
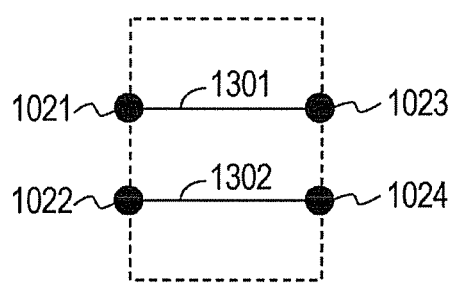
FIG. 16 is a schematic diagram illustrating a third connector section.

On the other hand, when an optical signal is to be transmitted at a bit rate of 43 Gbit/s, the connector section 1011 has a configuration as illustrated in, for example, FIG. 16. The connector section 1011 includes optical fibers 1301 and 1302. The optical fiber 1301 is provided between the input terminal 1021 and the output terminal 1023, and the optical fiber 1302 is provided between the input terminal 1022 and the output terminal 1024.

In this case, the transmission-signal generator 201 outputs a two-channel transmission signal at a bit rate of 21.5 Gbit/s to the driver amplifiers 203 and 204, and outputs the same two-channel transmission signal to the driver amplifiers 205 and 206. Thus, two optical signals modulated with the same signal at 43-Gbit/s without using polarization multiplexing are generated and output to the transmission paths 1001 and 1002, respectively.

Figure 17:
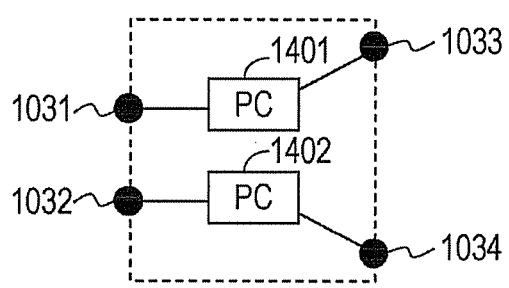
FIG. 17 is a schematic diagram illustrating a fourth connector section.
Figure 18:
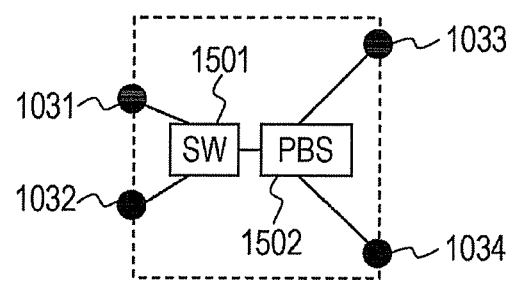
FIG. 18 is a schematic diagram illustrating a fifth connector section.

The connector section 1012 has a configuration as illustrated in, for example, FIG. 17 or 18. In the configuration illustrated in FIG. 17, the digital-signal processing circuit 245 is used to switch between the primary and secondary modes, whereas in the configuration illustrated in FIG. 18, protection is performed in an optical stage.

The connector section 1012 in FIG. 17 includes polarization controllers (PCs) 1401 and 1402. The PC 1401 is provided between the input terminal 1031 and the output terminal 1033, and the PC 1402 is provided between the input terminal 1032 and the output terminal 1034.

The optical receiver receives secondary-mode and primary-mode optical signals by means of an optical/electrical conversion circuit that does not utilize polarization diversity reception. The polarization of signal light is controlled at the PCs 1401 and 1402 so that local light and the signal light have the same polarization. For example, the PCs 1401 and 1402 are controlled by the digital-signal processing circuit 245 such that a beat signal to be input to the ADC circuits 241 to 244 is at the maximum.

The operation performed from the optical hybrids 234 and 235 to the ADC circuits 241 to 244 is the same as that in FIG. 2. The digital-signal processing circuit 245 independently demodulates two signals received from the transmission paths 1001 and 1002 and normally outputs the demodulated signals at the transmission path 1002 side. However, if a signal cutoff at the transmission path 1002 side is detected, demodulated signals at the transmission path 1001 side are immediately output. This allows for switching from primary-mode reception signals to secondary-mode reception signals.

The connector section 1012 in FIG. 18 includes a switch (SW) 1501 and a PBS 1502. The SW 1501 is controlled by the digital-signal processing circuit 245, and either the input terminal 1031 or 1032 is connected to an input terminal of the PBS 1502. The output terminals 1033 and 1034 are connected to an output terminal of the PBS 1502. The PBS 1502 operates in the same manner as the PBS 231 in FIG. 2.

The digital-signal processing circuit 245 normally controls the SW 1501 to select the input terminal 1032. When the digital-signal processing circuit 245 detects a signal cutoff at the transmission path 1002 side, the digital-signal processing circuit 245 controls the SW 1501 to select the input terminal 1031. This allows for switching from a primary-mode optical signal to a secondary-mode optical signal. Other operations of the optical receiver are the same as those in FIG. 2.

The configurations illustrated in FIGS. 13 to 18 are effective when there are poor PDL characteristics in the transmission interval. Since redundancy can be attained when the bit rate is 43 Gbit/s, the signal receptability can be further enhanced.

Figure 19:
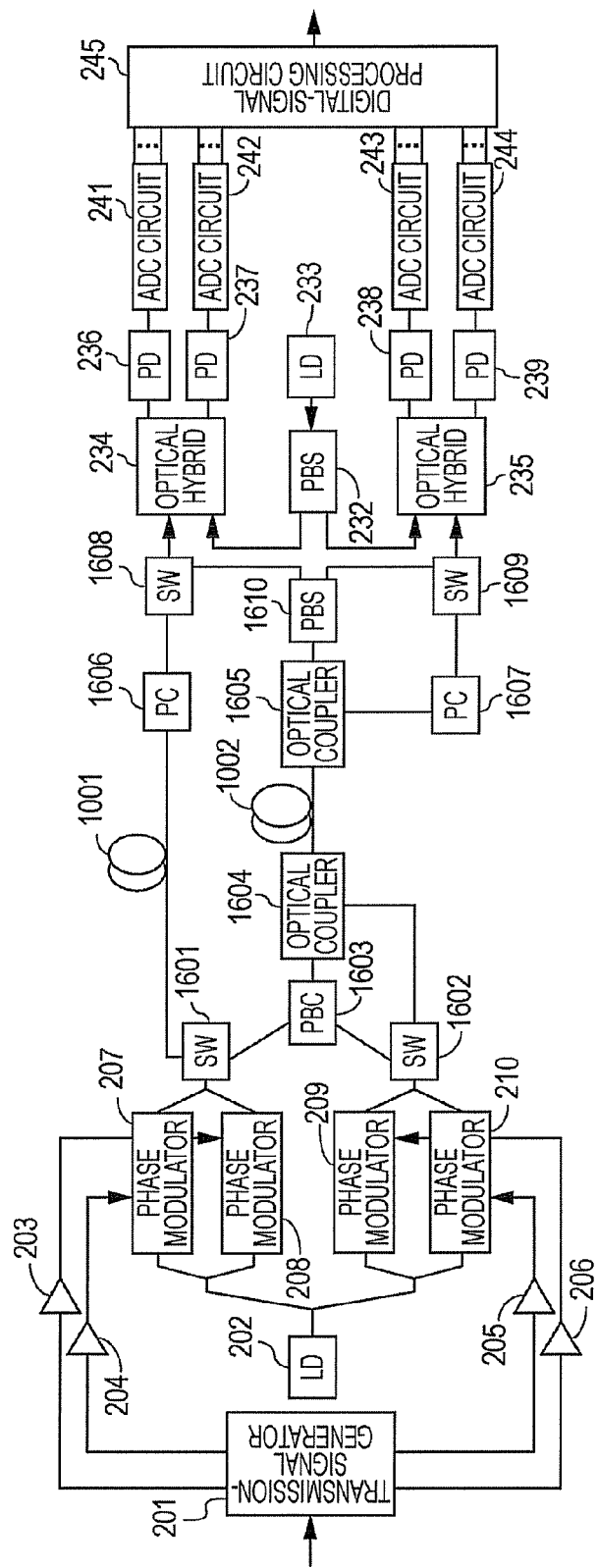
FIG. 19 is a schematic diagram illustrating a fifth digital-coherent optical transmitter-receiver.
Figure 20:
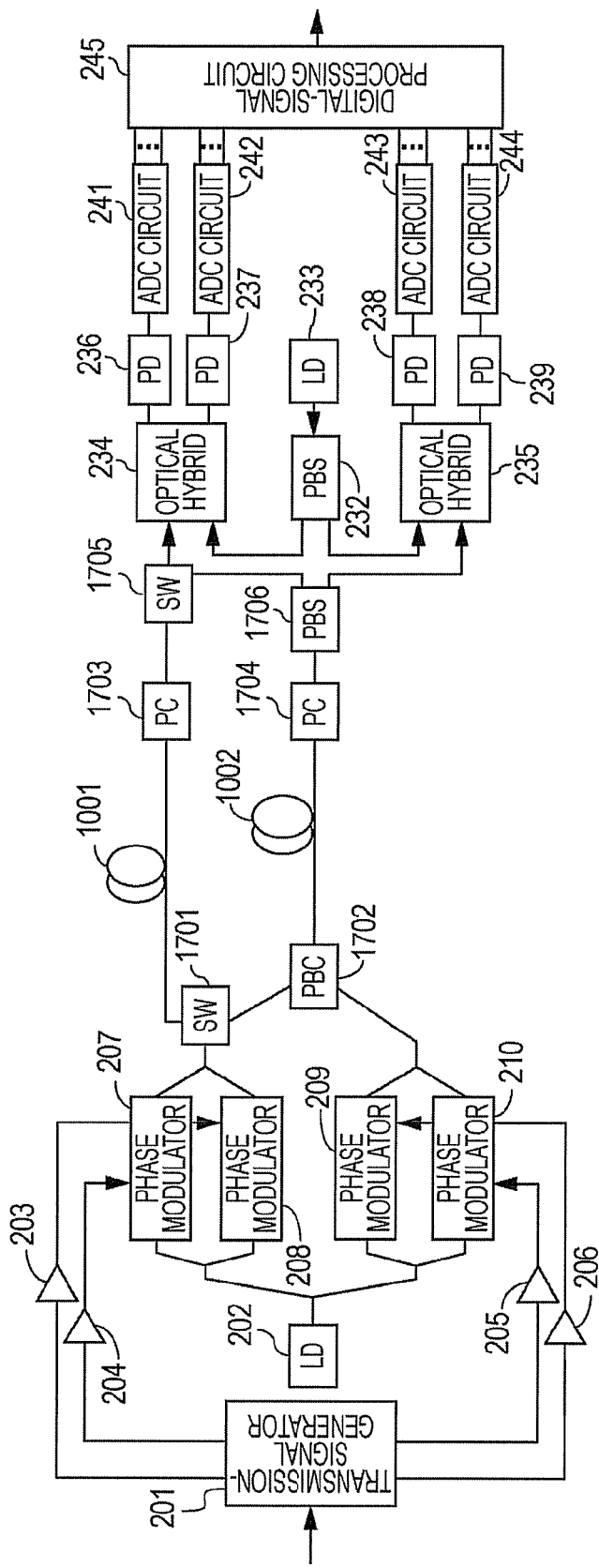
FIG. 20 is a schematic diagram illustrating a sixth digital-coherent optical transmitter-receiver.
Figure 21:
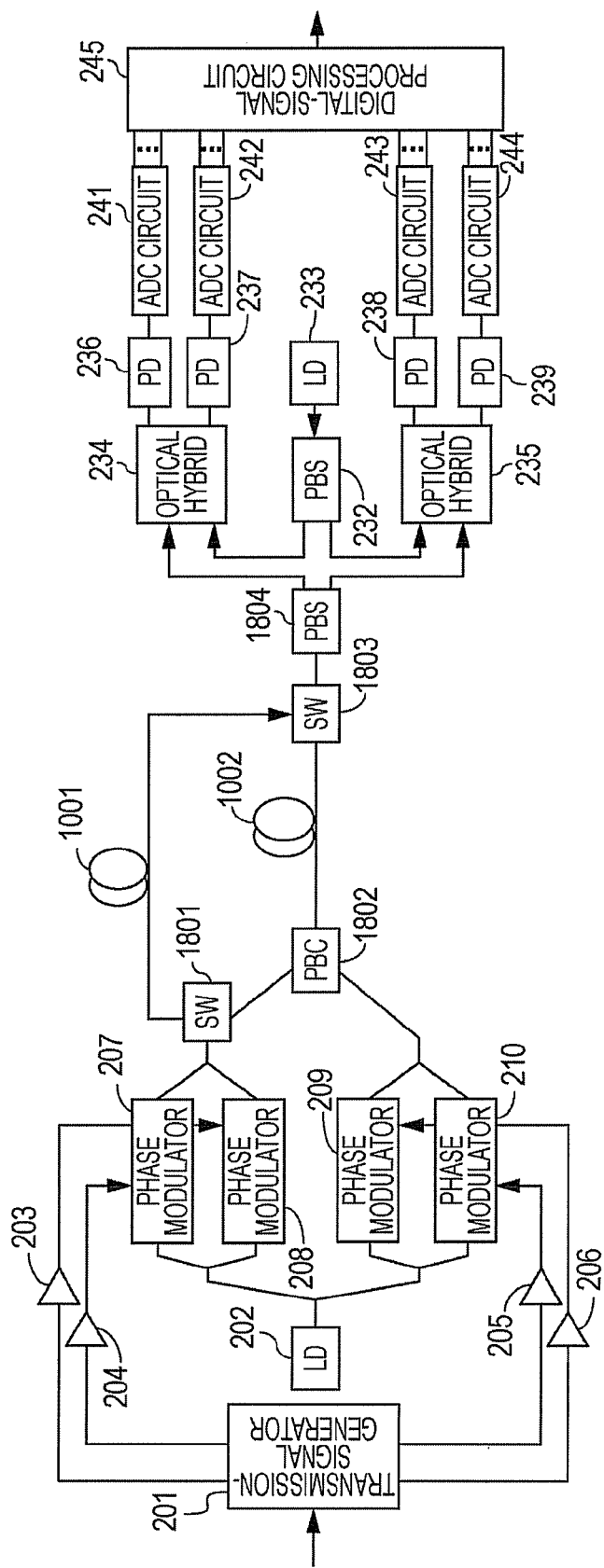
FIG. 21 is a schematic diagram illustrating a seventh digital-coherent optical transmitter-receiver.

In the configuration illustrated in FIG. 13, a process for preliminarily replacing the connector sections 1011 and 1012 in accordance with the assumed bit rate becomes necessary, but this replacement process may be performed automatically. In this case, the configuration is switched by using the bit rate information obtained by one of the above-described methods. FIGS. 19 to 21 illustrate configuration examples of such a digital-coherent optical transmitter-receiver.

In the configuration illustrated in FIG. 19, the optical transmitter is provided with SWs 1601 and 1602, a PBC 1603, and an optical coupler 1604, and the optical receiver is provided with an optical coupler 1605, PCs 1606 and 1607, SWs 1608 and 1609, and a PBS 1610. The PBC 1603 corresponds to the PBC 1101 in FIG. 13, the PCs 1606 and 1607 correspond to the PCs 1401 and 1402 in FIG. 17, and the PBS 1610 corresponds to the PBS 1201 in FIG. 15.

The SWs 1601, 1602, 1608, and 1609 switch input terminals or output terminals for an optical signal in accordance with bit rate information.

When an optical signal is to be transmitted at a bit rate of 112 Gbit/s, the SW 1601 connects the output terminals of the phase modulators 207 and 208 to an input terminal of the PBC 1603, and the SW 1602 connects the output terminals of the phase modulators 209 and 210 to an input terminal of the PBC 1603. The SW 1608 connects an output terminal of the PBS 1610 to an input terminal of the optical hybrid 234, and the SW 1609 connects the output terminal of the PBS 1610 to an input terminal of the optical hybrid 235. Thus, operation equivalent to that when using both the configurations illustrated in FIGS. 14 and 15 becomes possible.

On the other hand, when an optical signal is to be transmitted at a bit rate of 43 Gbit/s, the SW 1601 connects the output terminals of the phase modulators 207 and 208 to the transmission path 1001, and the SW 1602 connects the output terminals of the phase modulators 209 and 210 to an input terminal of the optical coupler 1604. The SW 1608 connects an output terminal of the PC 1606 to the input terminal of the optical hybrid 234, and the SW 1609 connects an output terminal of the PC 1607 to the input terminal of the optical hybrid 235. Thus, operation equivalent to that when using both the configurations illustrated in FIGS. 16 and 17 becomes possible.

In the configuration illustrated in FIG. 20, the optical transmitter is provided with an SW 1701 and a PBC 1702, and the optical receiver is provided with PCs 1703 and 1704, an SW 1705, and a PBS 1706. The PBC 1702 corresponds to the PBC 1101 in FIG. 14, the PCs 1703 and 1704 correspond to the PCs 1401 and 1402 in FIG. 17, and the PBS 1706 corresponds to the PBS 1201 in FIG. 15.

The SWs 1701 and 1705 switch input terminals or output terminals for an optical signal in accordance with bit rate information.

When an optical signal is to be transmitted at a bit rate of 112 Gbit/s, the SW 1701 connects the output terminals of the phase modulators 207 and 208 to an input terminal of the PBC 1702, and the SW 1705 connects an output terminal of the PBS 1706 to the input terminal of the optical hybrid 234. Thus, operation equivalent to that when using both the configurations illustrated in FIGS. 14 and 15 becomes possible.

On the other hand, when an optical signal is to be transmitted at a bit rate of 43 Gbit/s, the SW 1701 connects the output terminals of the phase modulators 207 and 208 to the transmission path 1001, and the SW 1705 connects an output terminal of the PC 1703 to the input terminal of the optical hybrid 234. Thus, operation equivalent to that when using both the configurations illustrated in FIGS. 16 and 17 becomes possible.

In this configuration, since the SW 1705 switches between a primary-mode optical signal and a secondary-mode optical signal, the optical receiver has a polarization diversity configuration, and the digital-signal processing circuit 245 demodulates a received signal using information about two polarized waves.

In a configuration illustrated in FIG. 21, the optical transmitter is provided with an SW 1801 and a PBC 1802, and the optical receiver is provided with an SW 1803 and a PBS 1804. The PBC 1802 corresponds to the PBC 1101 in FIG. 14, and the PBS 1804 corresponds to the PBS 1201 in FIG. 15 or the PBS 1502 in FIG. 18.

The SWs 1801 and 1803 switch input terminals or output terminals for an optical signal in accordance with bit rate information.

When an optical signal is to be transmitted at a bit rate of 112 Gbit/s, the SW 1801 connects the output terminals of the phase modulators 207 and 208 to an input terminal of the PBC 1802, and the SW 1803 connects the transmission path 1002 to an input terminal of the PBS 1804. Thus, operation equivalent to that when using both the configurations illustrated in FIGS. 14 and 15 becomes possible.

On the other hand, when an optical signal is to be transmitted at a bit rate of 43 Gbit/s, the SW 1801 connects the output terminals of the phase modulators 207 and 208 to the transmission path 1001. Thus, operation equivalent to that when using both the configurations illustrated in FIGS. 16 and 18 becomes possible.

In this configuration, since the SW 1803 switches between a primary-mode optical signal and a secondary-mode optical signal, the optical receiver has a polarization diversity configuration, and the digital-signal processing circuit 245 demodulates a received signal using information about two polarized waves, as in the case in FIG. 20.

Figure 22:
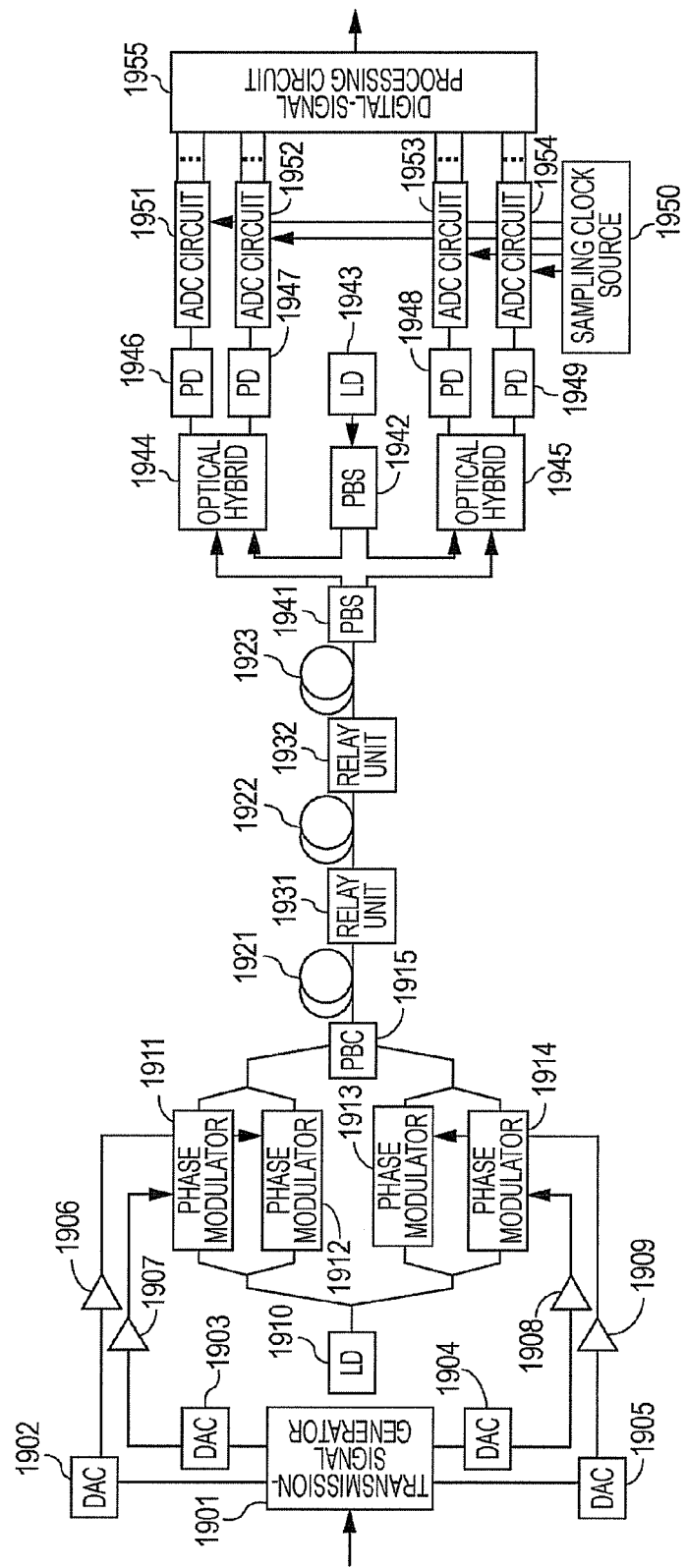
FIG. 22 is a schematic diagram illustrating an eighth digital-coherent optical transmitter-receiver.

FIG. 22 illustrates a configuration example of a digital-coherent optical transmitter-receiver that uses a DP-OFDM method as a modulation method. This digital-coherent optical transmitter-receiver is configured to operate at various bit rates.

The optical transmitter includes a transmission-signal generator 1901, digital/analog converters (DACs) 1902 to 1905, driver amplifiers 1906 to 1909, an LD 1910, phase modulators 1911 to 1914, and a PBC 1915, and transmits an optical signal to the optical receiver via transmission paths 1921 to 1923 and repeaters 1931 and 1932.

The optical receiver includes PBSs 1941 and 1942, an LD 1943, optical hybrids 1944 and 1945, PDs 1946 to 1949, a sampling clock source 1950, ADC circuits 1951 to 1954, and a digital-signal processing circuit 1955, and receives the optical signal from the transmission path 1923.

The DACs 1902 to 1905 of the optical transmitter convert a transmission signal output from the transmission-signal generator 1901 into an analog signal and output the analog signal to the driver amplifiers 1906 to 1909, respectively. The operations of other components are the same as those in FIG. 2.

The following is a description of an example of operations performed at two bit rates, 112 Gbit/s and 43 Gbit/s.

When an optical signal is to be transmitted at a bit rate of 112 Gbit/s, OFDM modulation QPSK-encoded with two subcarriers is used. The transmission-signal generator 1901 generates, from a received baseband signal, four multilevel signals that correspond to a real part and an imaginary part of an x-polarized wave and a real part and an imaginary part of a y-polarized wave for performing the OFDM modulation. The four multilevel signals are then output to the driver amplifiers 1906 to 1909, respectively.

The phase modulators 1911 to 1914 use the respective multilevel signals to modulate light output from the LD 1910 so as to generate a 112-Gbit/s optical signal.

The sampling clock source 1950 of the optical receiver generates a 56-GHz clock signal. The ADC circuits 1951 to 1954 perform sampling at 56 GHz and output a data signal with a parallel number of 4 to the digital-signal processing circuit 1955. In this case, the data rate of the data signal to be input to the digital-signal processing circuit 1955 is 14 GHz.

On the other hand, when an optical signal is to be transmitted at a bit rate of 43 Gbit/s, the subcarriers are reduced by one and OFDM modulation QPSK-encoded with a single subcarrier is used (DP-QPS modulation when using a single subcarrier). Similar to the case of 112 Gbit/s, the transmission-signal generator 1901 generates four multilevel signals from a received baseband signal and outputs the four signals to the driver amplifiers 1906 to 1909, respectively.

The phase modulators 1911 to 1914 use the respective multilevel signals to modulate light output from the LD 1910 so as to generate a 43-Gbit/s optical signal.

The sampling clock source 1950 of the optical receiver generates a 57.3-GHz clock signal. The ADC circuits 1951 to 1954 perform sampling at 57.3 GHz and output a data signal with a parallel number of 3 to the digital-signal processing circuit 1955. In this case, the data rate of the data signal to be input to the digital-signal processing circuit 1955 is 14.3 GHz.

This configuration is effective not only when the OSNR of a received signal does not satisfy a required value, but also when there is significant waveform degradation caused by optical filters, provided in the repeaters 1931 and 1932, for insertion and/or bifurcation of paths.

Figure 23:
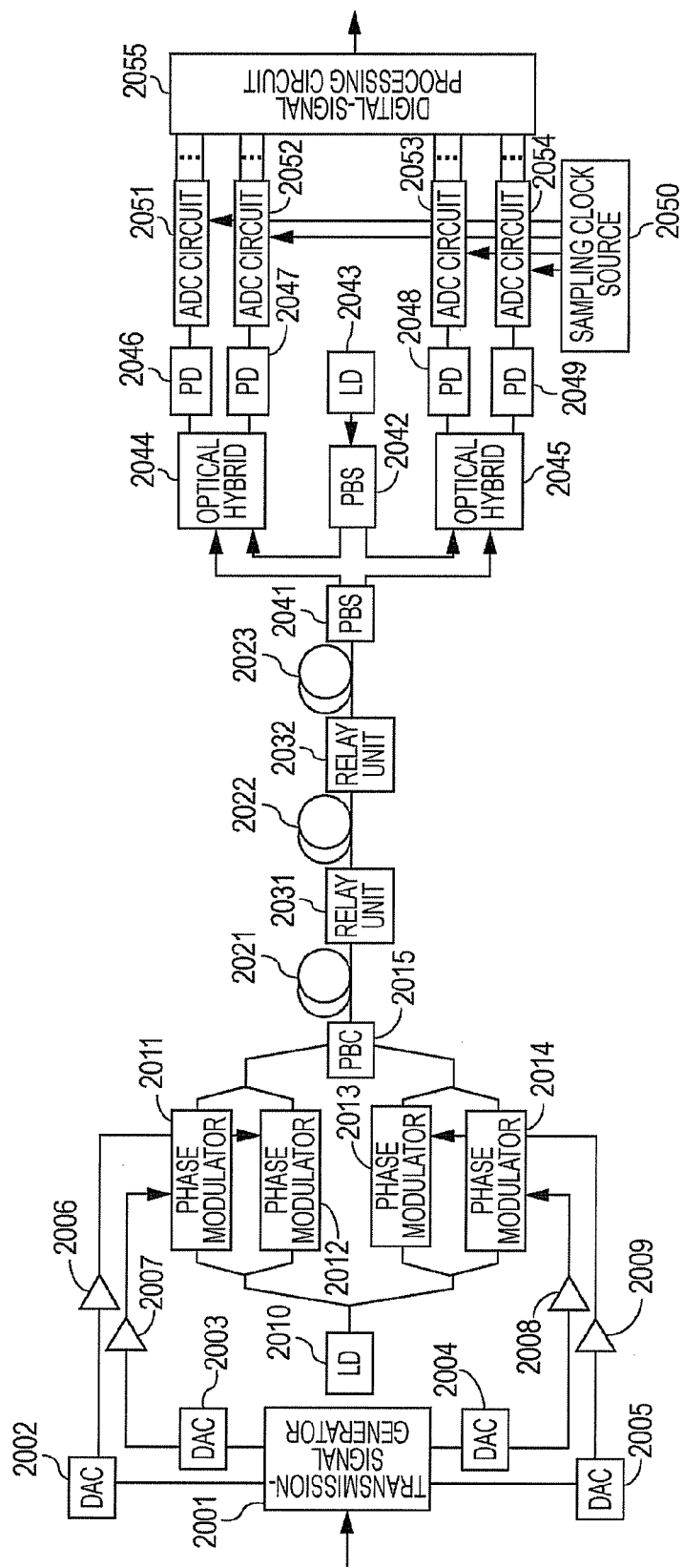
FIG. 23 is a schematic diagram illustrating a ninth digital-coherent optical transmitter-receiver.

FIG. 23 illustrates a configuration example of a digital-coherent optical transmitter-receiver that uses a DP-multi-level modulation method as a modulation method. This digital-coherent optical transmitter-receiver is configured to operate at various bit rates.

The optical transmitter includes a transmission-signal generator 2001, DACs 2002 to 2005, driver amplifiers 2006 to 2009, an LD 2010, phase modulators 2011 to 2014, and a PBC 2015, and transmits an optical signal to the optical receiver via transmission paths 2021 to 2023 and repeaters 2031 and 2032.

The optical receiver includes PBSs 2041 and 2042, an LD 2043, optical hybrids 2044 and 2045, PDs 2046 to 2049, a sampling clock source 2050, ADC circuits 2051 to 2054, and a digital-signal processing circuit 2055, and receives the optical signal from the transmission path 2023. Accordingly, the configuration of the optical transmitter-receiver is the same as that in FIG. 22.

The following is a description of an example of operations performed at two bit rates, 112 Gbit/s and 43 Gbit/s.

When an optical signal is to be transmitted at a bit rate of 112 Gbit/s, a 16-QAM modulation method is used. The transmission-signal generator 2001 generates, from a received baseband signal, four multilevel signals that correspond to a real part and an imaginary part of an x-polarized wave and a real part and an imaginary part of a y-polarized wave for performing the 16-QAM modulation. The four multilevel signals are then output to the driver amplifiers 2006 to 2009, respectively.

The phase modulators 2011 to 2014 use the respective multilevel signals to modulate light output from the LD 2010 so as to generate a 112-Gbit/s optical signal.

The sampling clock source 2050 of the optical receiver generates a 56-GHz clock signal. The ADC circuits 2051 to 2054 perform sampling at 56 GHz and output a data signal with a parallel number of 4 to the digital-signal processing circuit 2055. In this case, the data rate of the data signal to be input to the digital-signal processing circuit 2055 is 14 GHz.

On the other hand, when an optical signal is to be transmitted at a bit rate of 43 Gbit/s, the QPSK modulation method is used by changing a multilevel value M of the multilevel modulation method from 16 to 4. Similar to the case of 112 Gbit/s, the transmission-signal generator 2001 generates four multilevel signals from a received baseband signal and outputs the four signals to the driver amplifiers 2006 to 2009, respectively.

The phase modulators 2011 to 2014 use the respective multilevel signals to modulate light output from the LD 2010 so as to generate a 43-Gbit/s optical signal.

The sampling clock source 2050 of the optical receiver generates a 57.3-GHz clock signal. The ADC circuits 2051 to 2054 perform sampling at 57.3 GHz and output a data signal with a parallel number of 3 to the digital-signal processing circuit 2055. In this case, the data rate of the data signal to be input to the digital-signal processing circuit 2055 is 14.3 GHz.

Although QPSK, two-subcarrier OFDM, and 16-QAM methods have been described in the above-described embodiments, other modulation methods such as NRZ, RZ, M-PSK, M-QAM, OFDM, and FDM methods may be used, or a modulation method with a combination of these methods and polarization multiplexing may also be used.

Although a coherent receiving method has been described in the above embodiments, a combination of a direct-detection-type optical/electrical conversion circuit and the ADC circuits proposed in the invention is also permissible.

Although the disclosed embodiments and the advantages thereof have been described above in detail, a skilled person may conceive of various modifications, additions, and omissions without departing from the scope of the invention clearly specified in the claims.

The optical receiver according to the above-described embodiments can handle various bit rates without having to significantly change the sampling frequency of an ADC or making the data rate of a parallel data signal adjustable.

What is claimed is:

1. An optical receiver, comprising:
    a photo-detector that converts a received optical signal into an electric signal and outputs the electric signal;
    a converter that converts the electric signal into a parallel data signal and outputs the parallel data signal;
    a parallel-number changing circuit that changes a parallel number of the parallel data signal in accordance with a bit rate of the optical signal and outputs the parallel data signal having the changed parallel number; and
    an acquiring circuit that acquires bit rate information about the optical signal and outputs the bit rate information to the parallel-number changing circuit,
    wherein the parallel-number changing circuit includes a plurality of changing circuits that output parallel data signals having different parallel numbers from each other in correspondence to a plurality of bit rates, and selectively uses, among the plurality of changing circuits, a changing circuit that corresponds to the bit rate of the optical signal.

2. The optical receiver according to claim 1, wherein each of the plurality of changing circuits changes a sampling rate of the parallel data signal output from the converter so as to change the parallel number of the parallel data signal.

3. The optical receiver according to claim 2, wherein each of the plurality of changing circuits includes an upsampling circuit that increases the sampling rate of the parallel data signal output from the converter, an averaging filter that averages a data signal output from the upsampling circuit and outputs the data signal, and a downsampling circuit that decreases the sampling rate of the data signal output from the averaging filter.

4. The optical receiver according to claim 1, wherein the acquiring circuit acquires the bit rate information from a network control device.

5. The optical receiver according to claim 1, wherein the acquiring circuit acquires the bit rate information based on an amount of change per unit time of a sampling phase of the parallel data signal output from the converter or the parallel data signal having the changed parallel number and the frequency of a sampling clock signal used by the converter.

6. The optical receiver according to claim 1, wherein the acquiring circuit acquires the bit rate information based on a spectrum shape of an optical spectrum of the optical signal.

7. The optical receiver according to claim 1, wherein the converter includes an anti-aliasing filter that has a filter band that changes in accordance with the bit rate of the optical signal and filters the electric signal.

8. An optical communication system including a polarization-multiplexing optical transmitter that modulates two orthogonal polarized-wave components using different pieces of signal information and transmits the polarized-wave components, and the optical receiver according to claim 1,
    wherein, when characteristics of a received signal do not satisfy predetermined characteristics, the optical communication system performs communication using only one polarized wave.

9. The optical communication system according to claim 8, wherein the optical communication system has redundancy such that, when the bit rate of the optical signal is decreased, one polarization channel serves as a primary line and another polarization channel serves as a secondary line.

10. The optical communication system according to claim 8, wherein the optical communication system includes a multilevel optical transmitter that performs transmission after modulating multilevel information in one symbol time,
    wherein, if the characteristics of the received signal do not satisfy the predetermined characteristics, the optical communication system performs communication after reducing a multilevel value.

11. An optical communication system including a multicarrier optical transmitter that modulates a plurality of subcarriers using different pieces of signal information and transmits the subcarriers, and the optical receiver according to claim 1,
    wherein, when characteristics of a received signal do not satisfy predetermined characteristics, the optical communication system performs communication after decreasing the number of carriers to be transmitted.

12. An optical receiving method, comprising:
    converting an optical signal into an electric signal;
    converting the electric signal into a parallel data signal;
    changing, using a parallel-number changer, a parallel number of the parallel data signal in accordance with a bit rate of the optical signal and outputting the parallel data signal having the changed parallel number; and
    acquiring bit rate information about the optical signal and outputting the bit rate information to the parallel-number changer,
    wherein the outputting of the parallel data signal includes outputting parallel data signals having different parallel numbers from each other in correspondence to a plurality of bit rates, and selectively using, among the parallel data signals, a parallel data signal that corresponds to the bit rate of the optical signal.

13. An optical communication system, comprising:
an optical receiver that includes:
a photo-detector that converts a received optical signal into an electric signal and outputs the electric signal,
a converter that quantizes the electric signal, converts the electric signal into a parallel data signal, and outputs the parallel data signal,
a parallel-number changer changing a parallel number of the parallel data signal in accordance with a bit rate of the optical signal and outputting the parallel data signal having the changed parallel number,
acquiring means for acquiring bit rate information about the optical signal and outputting the bit rate information to the parallel-number changer,
a signal processor that demodulates a received signal based on the parallel data signal,
a monitor that monitors the quality of the demodulated signal, and
a communication device that informs a transmitter that the signal quality is equal to or below a predetermined value; and
an optical transmitter including a bit-rate changing device that changes the bit rate based on the informed signal quality.

14. The optical communication system according to claim 13, wherein the optical communication system further comprises a bidirectional communication system, wherein, when the quality of a received signal does not satisfy the predetermined value, the optical communication system changes the bit rate of an opposing transmitter and informs the transmitter of the quality.

* * * * *